United States Patent

Hashiya

[11] Patent Number: 5,912,987
[45] Date of Patent: Jun. 15, 1999

[54] COLOR DETECTING APPARATUS FOR INSPECTING A COLOR OF A PRINTED MATTER

[75] Inventor: Seiichi Hashiya, Yokohama, Japan

[73] Assignee: Kabushiki Kaisha Toshiba, Kawasaki, Japan

[21] Appl. No.: 08/738,657

[22] Filed: Oct. 30, 1996

[30] Foreign Application Priority Data

Nov. 1, 1995 [JP] Japan .................................. 7-285145

[51] Int. Cl.$^6$ ............................................... G06K 9/00
[52] U.S. Cl. ............................................... 382/162
[58] Field of Search .................................. 382/164, 165, 382/197; 364/526

[56] References Cited

U.S. PATENT DOCUMENTS

| | | | |
|---|---|---|---|
| 4,199,748 | 4/1980 | Bacus | 382/197 |
| 4,493,105 | 1/1985 | Beall et al. | 382/197 |
| 4,654,794 | 3/1987 | O'Brien . | |
| 4,948,256 | 8/1990 | Lin et al. . | |
| 5,329,595 | 7/1994 | Davies | 382/165 |

FOREIGN PATENT DOCUMENTS

| | | |
|---|---|---|
| 0 312 939 | 5/1989 | European Pat. Off. . |
| 0 461 861 | 12/1991 | European Pat. Off. . |
| 63-218828 | 9/1988 | Japan . |
| WO 96/23281 | 8/1996 | WIPO . |

OTHER PUBLICATIONS

Frank Goodenough, "Fiber Cable, Diffraction Grating, Photodiodes, and Processor Measure Color", 2328 Electronic Design International 38, Dec. 13, 1990, No. 23, pp. 32 and 34.

Primary Examiner—Amelia Au
Assistant Examiner—Samir Ahmed
Attorney, Agent, or Firm—Pillsbury Madison & Sutro LLP

[57] ABSTRACT

A color detecting apparatus comprises a mechanism for decomposing light from an inspection target object into a plurality of kinds of wavelength components and for inputting the wavelength components as spectrum data, a memory for storing the spectrum data, a mechanism for calculating out a physical characteristic amount of the spectrum data, a memory for storing reference data to be used as reference for the characteristic amount, and a mechanism for comparing the characteristic amount with the reference data, thereby to determine whether or not a color of the inspection target object is a reference color.

3 Claims, 23 Drawing Sheets

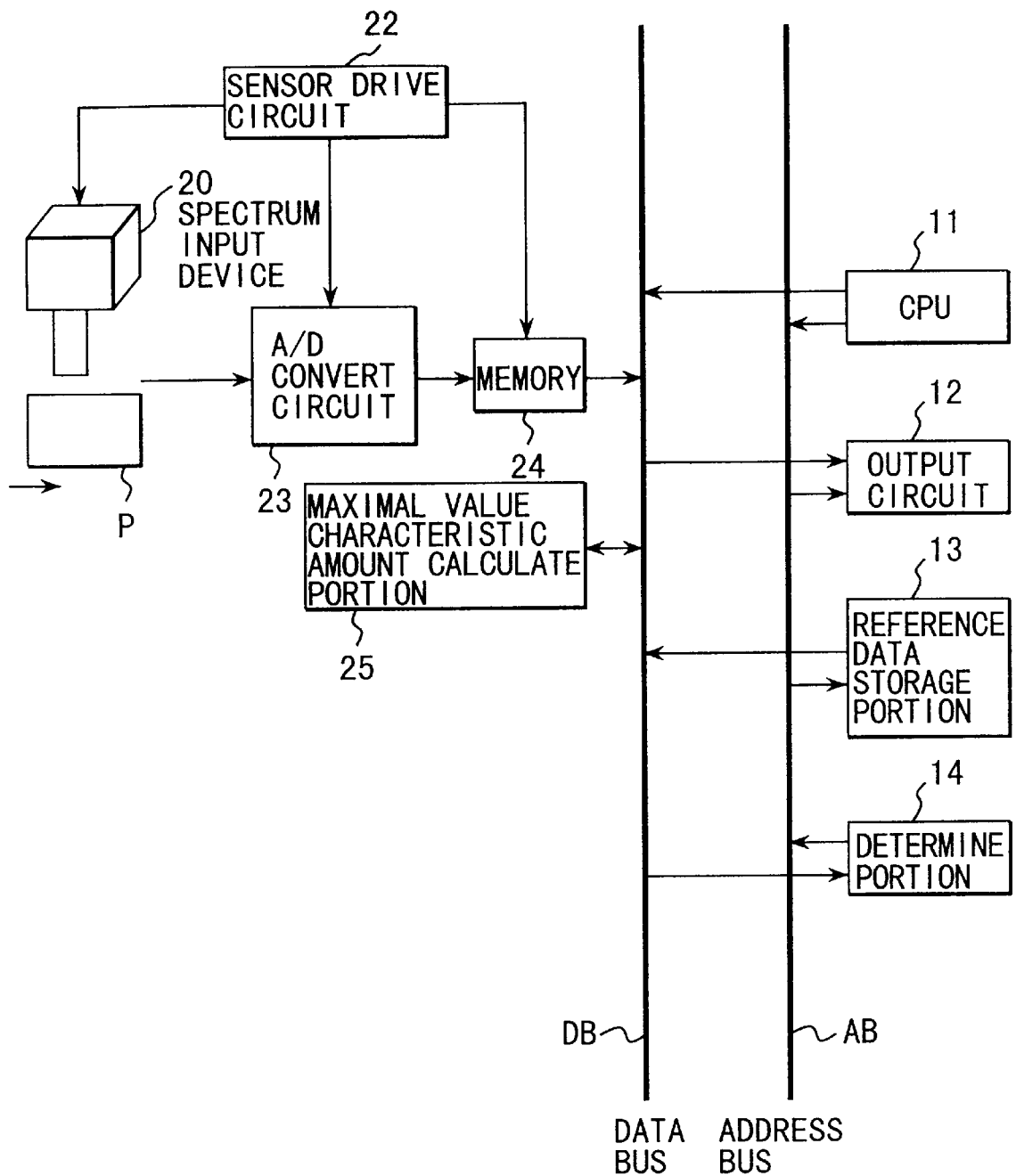
F I G. 1

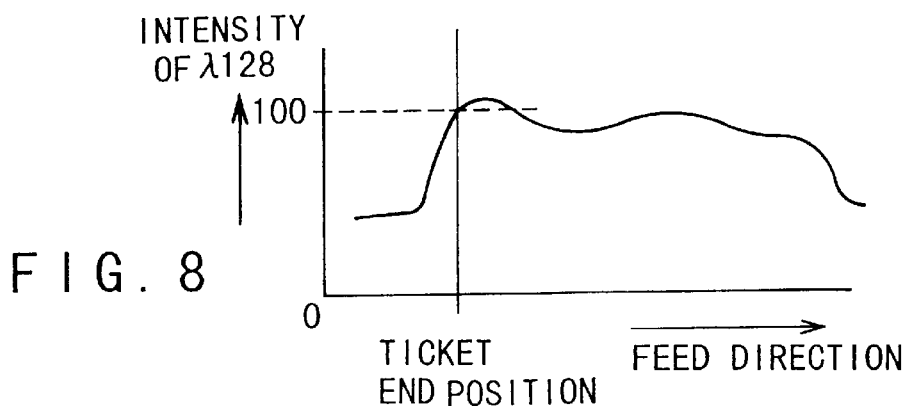
F I G. 8
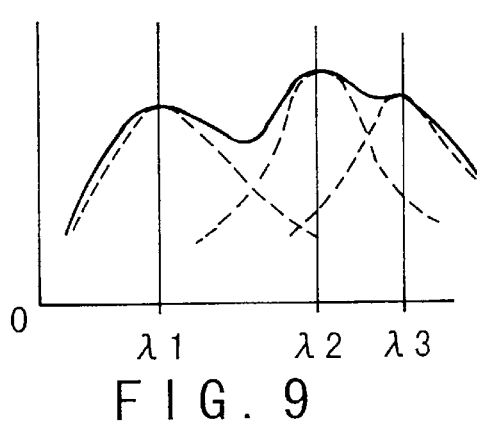
F I G. 9
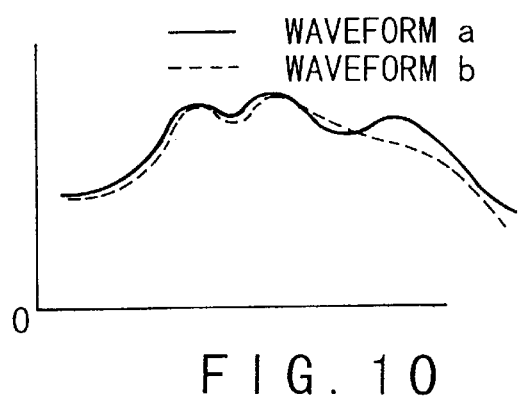
F I G. 10
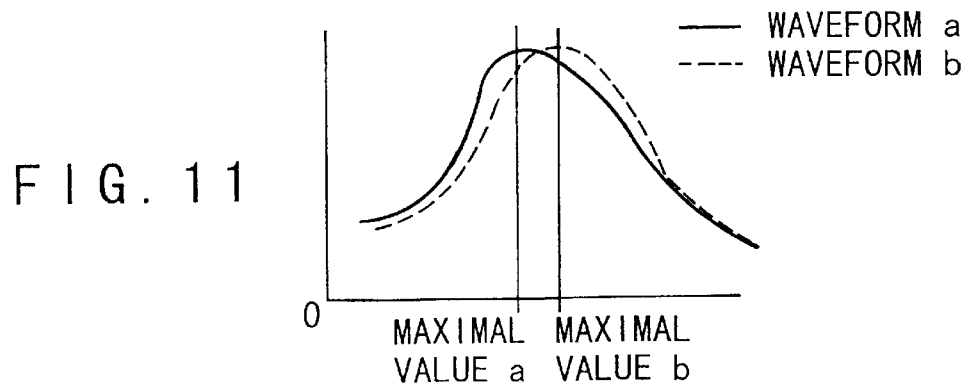
F I G. 11
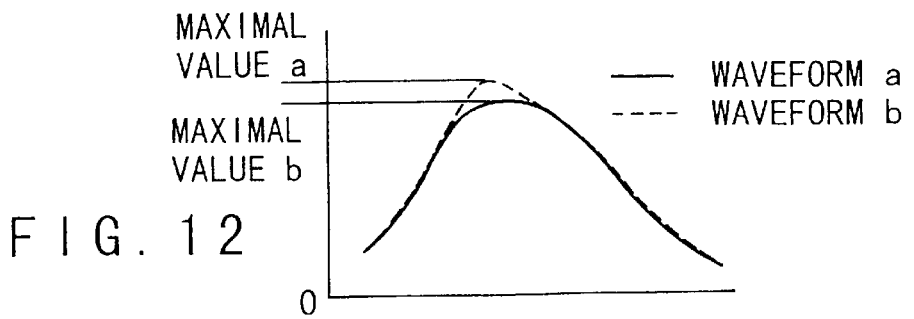
F I G. 12

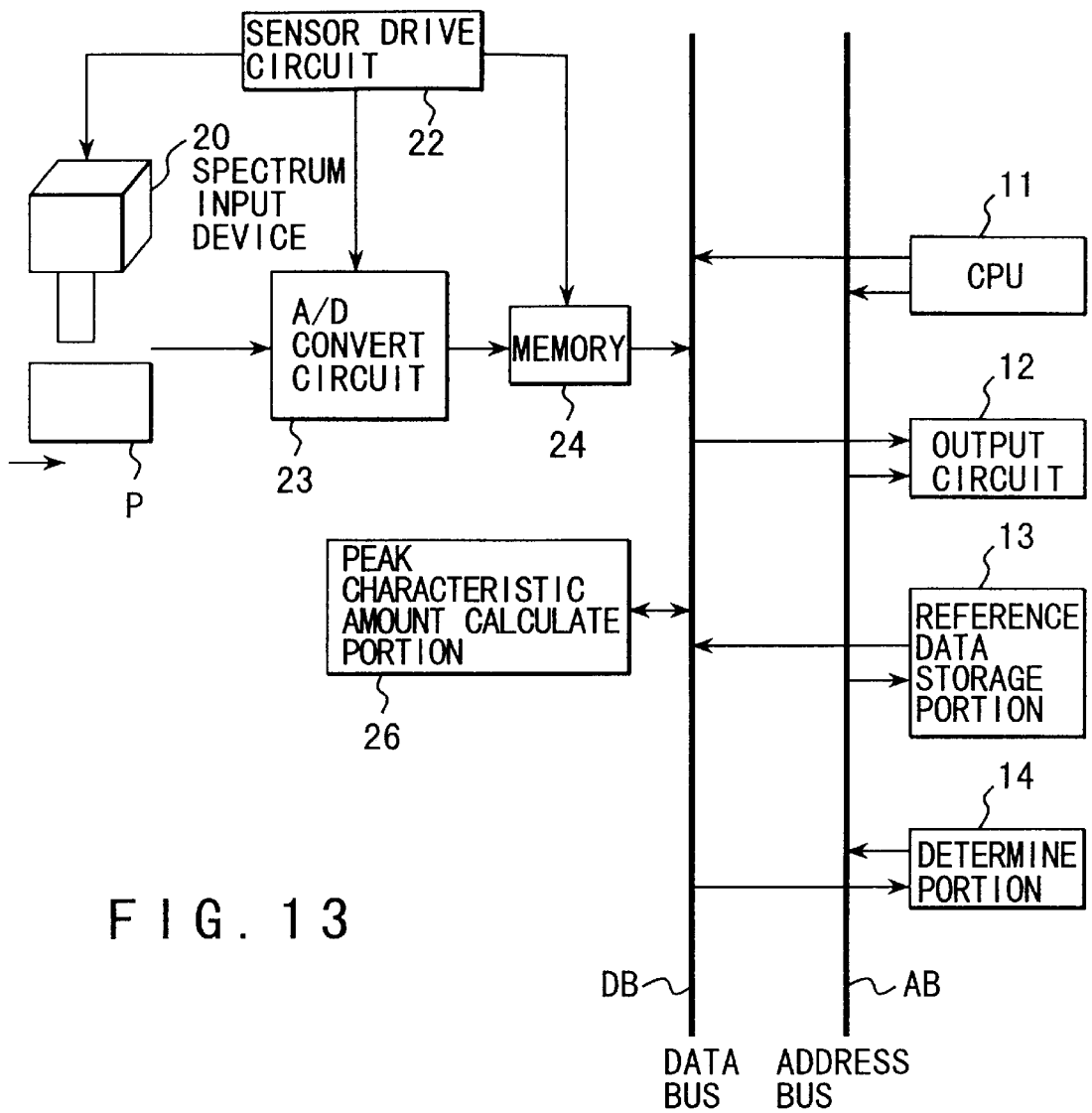
F I G. 1 3
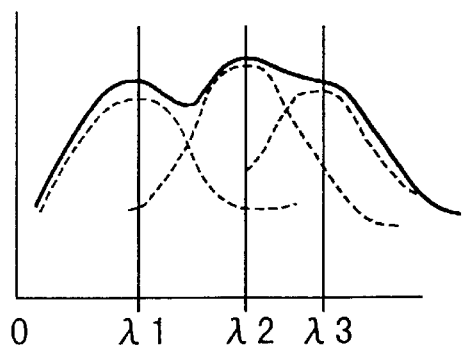
F I G. 1 4
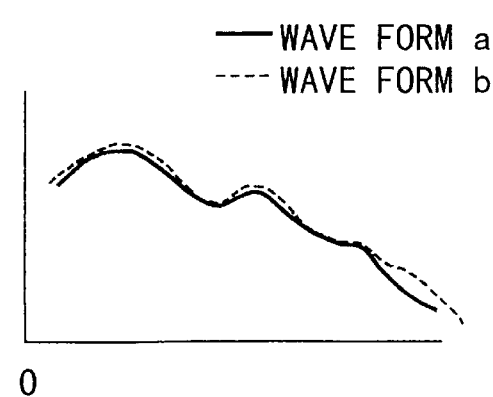
F I G. 1 5

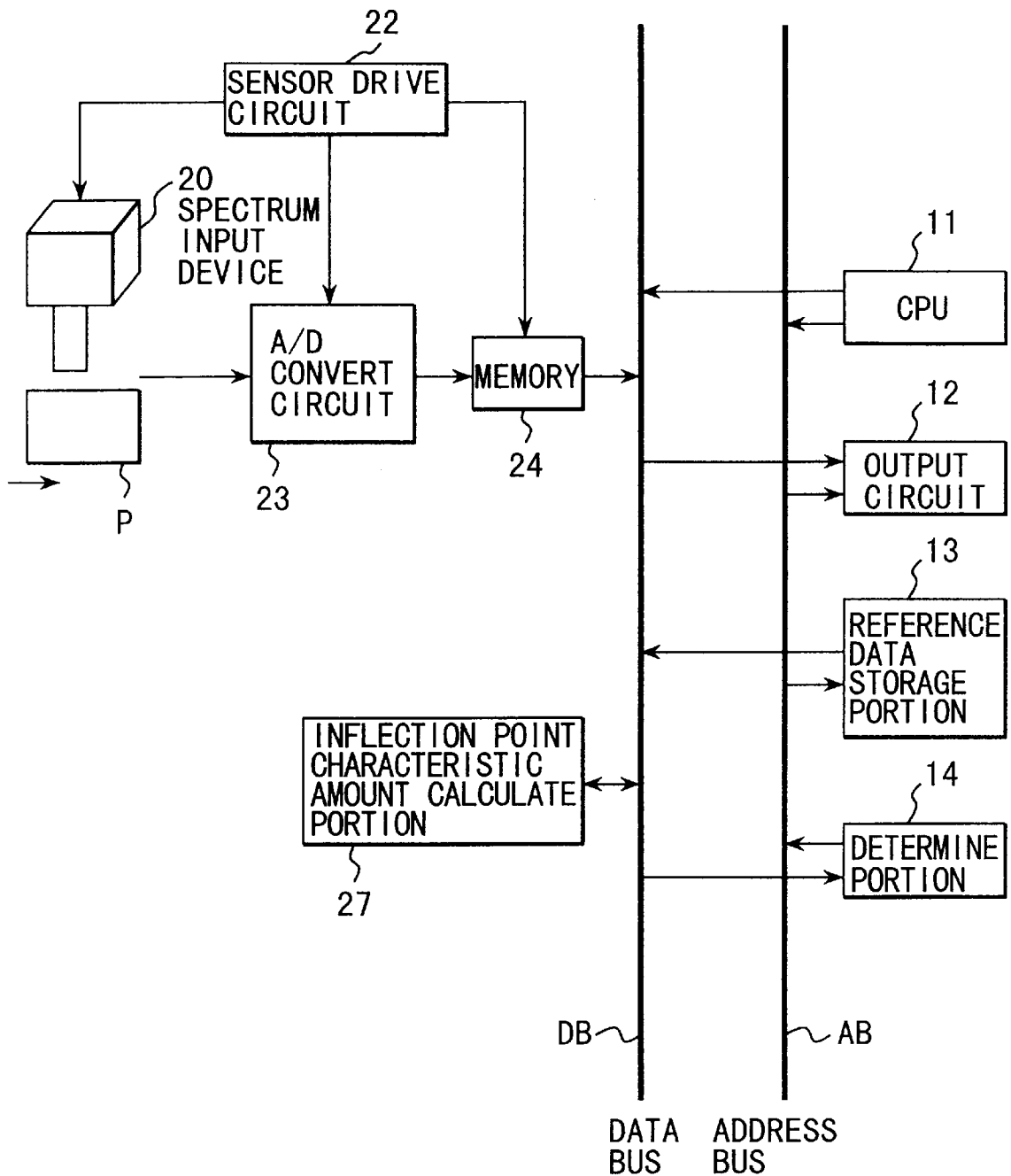
F I G. 2 0

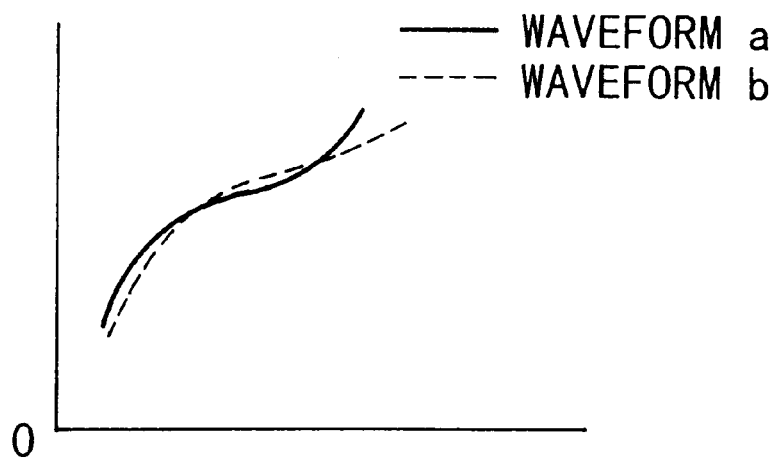
F I G. 22
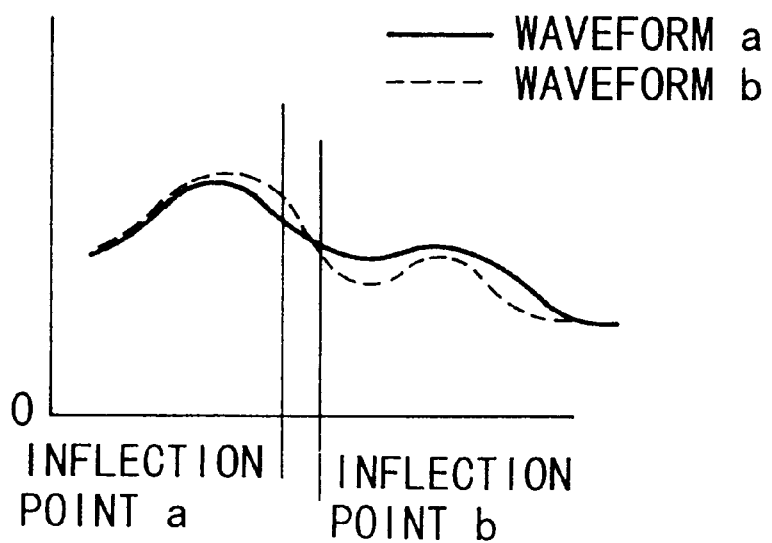
F I G. 23

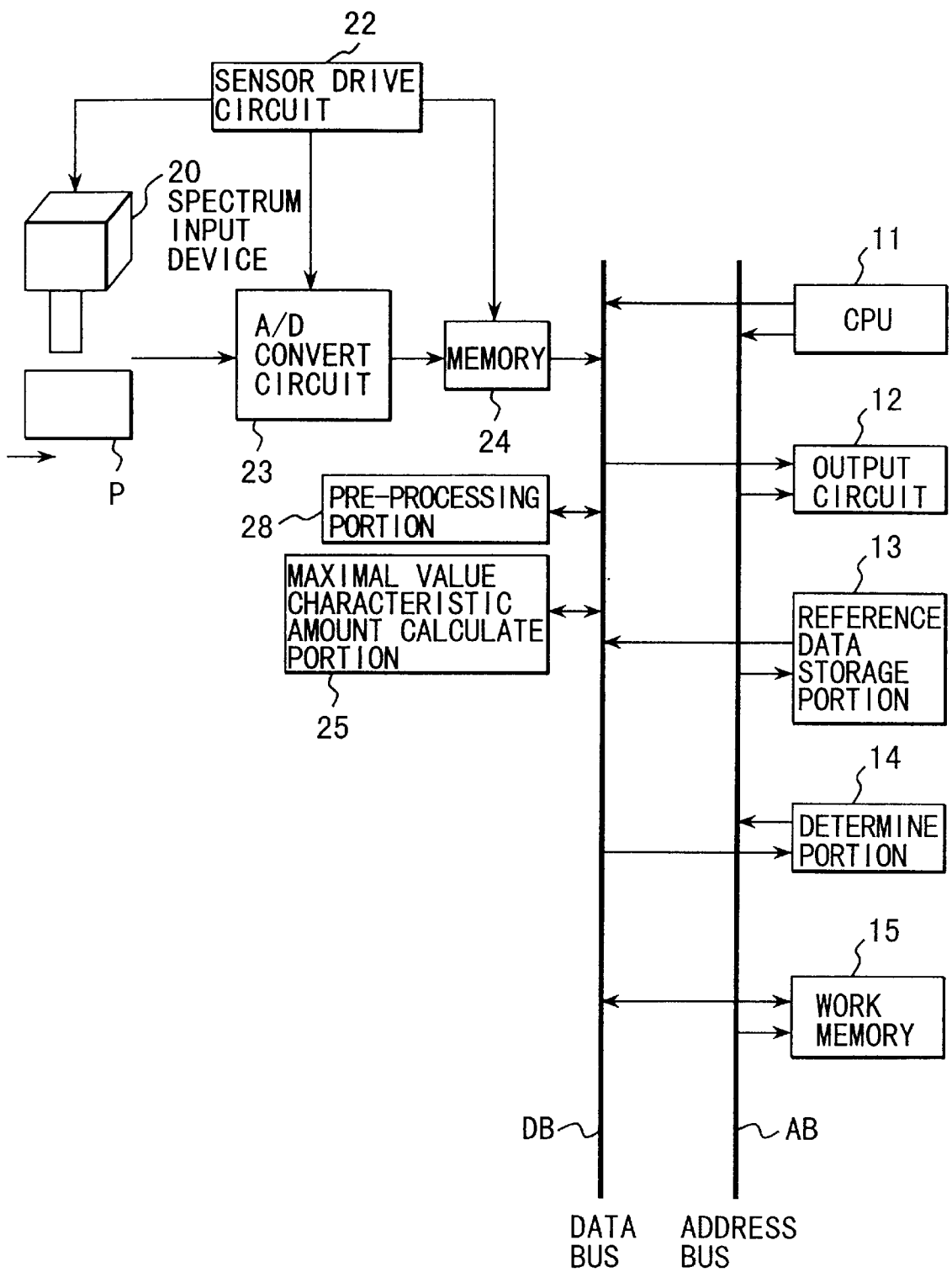
F I G. 2 4

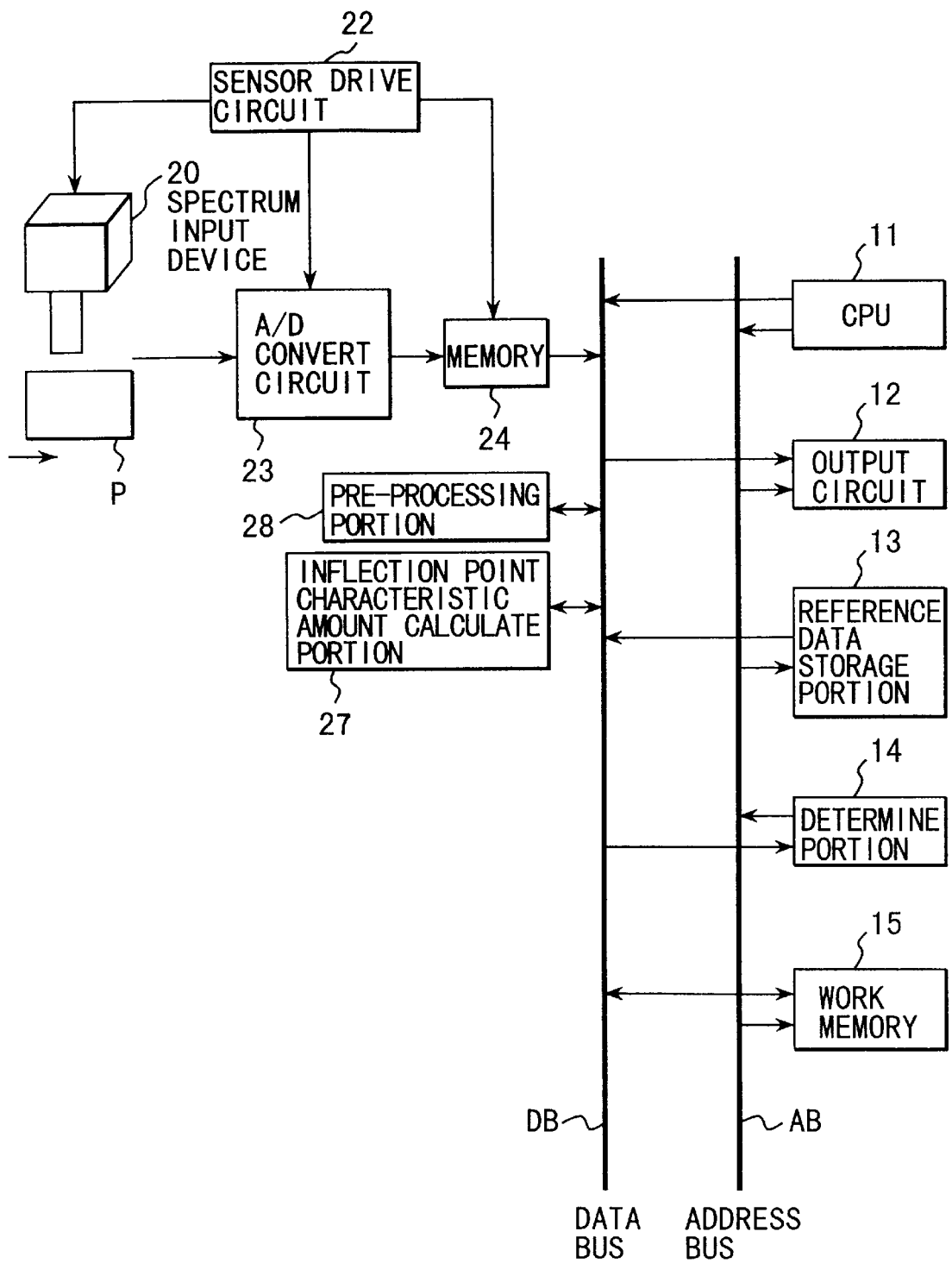
F I G. 2 6

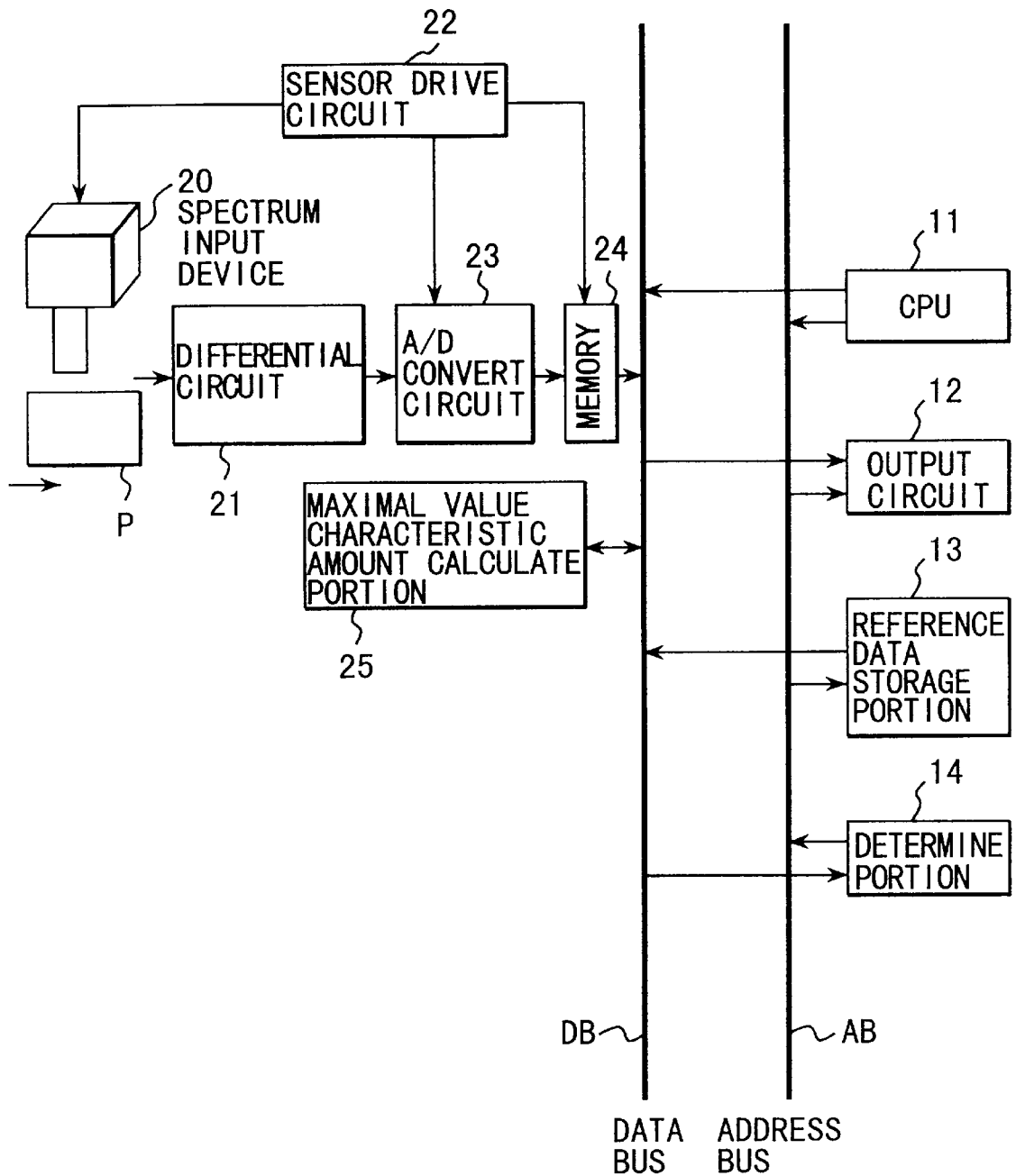
F I G. 27

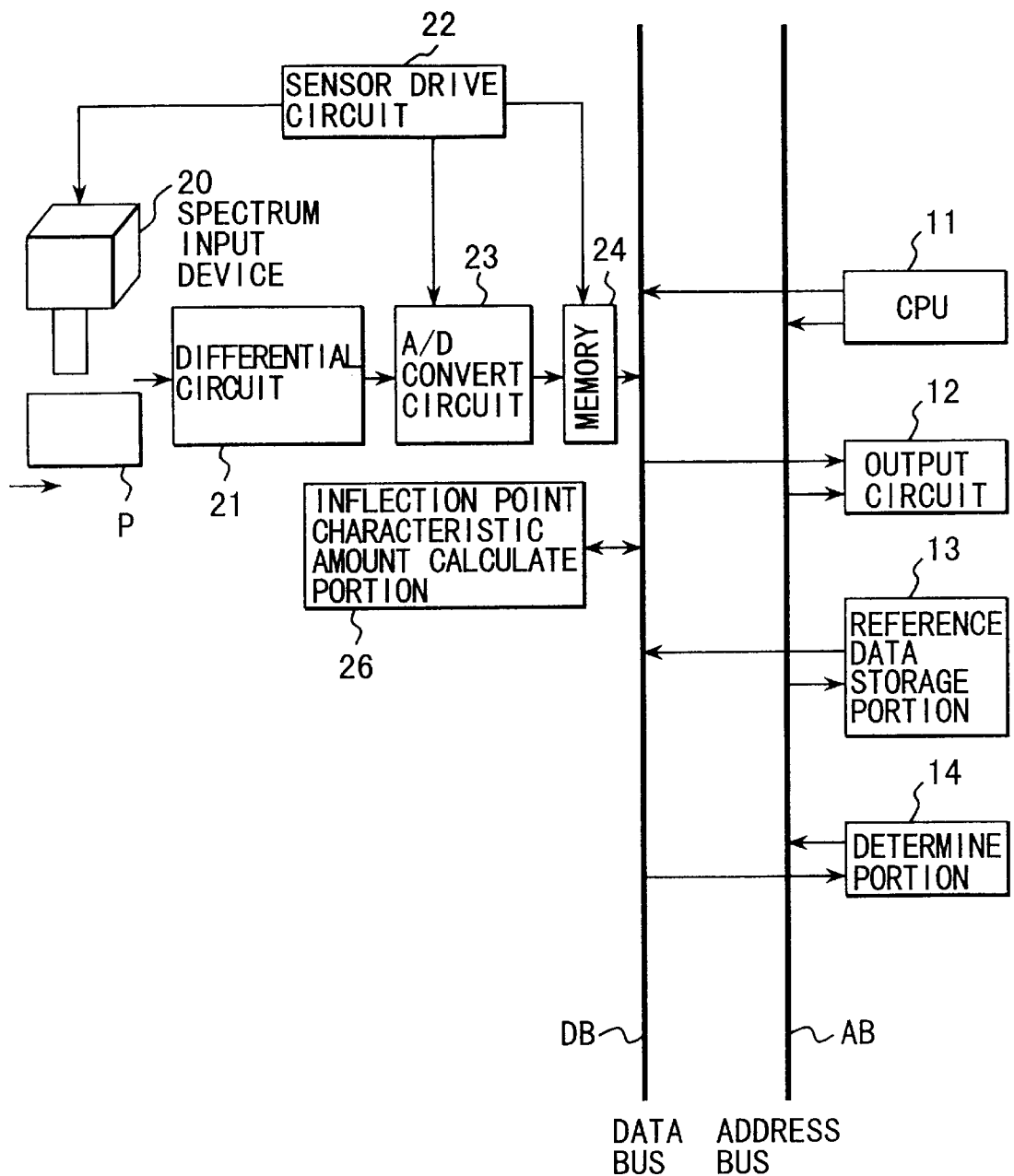
F I G. 3 1

FIG. 32

| Discrete Point Number | j=-12 | -11 | -10 | -9 | -8 | -7 | -6 | -5 | -4 | -3 | -2 | -1 | 0 | 1 | 2 | 3 | 4 | 5 | 6 | 7 | 8 | 9 | 10 | 11 | 12 | Normalization Coefficient |
|---|---|---|---|---|---|---|---|---|---|---|---|---|---|---|---|---|---|---|---|---|---|---|---|---|---|---|
| 5  |   |   |   |   |   |   |   |   |   |   | -3 | 12 | 17 | 12 | -3 |   |   |   |   |   |   |   |   |   |   | 35 |
| 7  |   |   |   |   |   |   |   |   |   | -2 | 3 | 6 | 7 | 6 | 3 | -2 |   |   |   |   |   |   |   |   |   | 21 |
| 9  |   |   |   |   |   |   |   |   | -21 | 14 | 39 | 54 | 59 | 54 | 39 | 14 | -21 |   |   |   |   |   |   |   |   | 231 |
| 11 |   |   |   |   |   |   |   | -36 | 9 | 44 | 69 | 84 | 89 | 84 | 69 | 44 | 9 | -36 |   |   |   |   |   |   |   | 429 |
| 13 |   |   |   |   |   |   | -11 | 0 | 9 | 16 | 21 | 24 | 25 | 24 | 21 | 16 | 9 | 0 | -11 |   |   |   |   |   |   | 143 |
| 15 |   |   |   |   |   | -78 | -13 | 42 | 87 | 122 | 147 | 162 | 167 | 162 | 147 | 122 | 87 | 42 | -13 | -78 |   |   |   |   |   | 1105 |
| 17 |   |   |   |   | -21 | -6 | 7 | 18 | 27 | 34 | 39 | 42 | 43 | 42 | 39 | 34 | 27 | 18 | 7 | -6 | -21 |   |   |   |   | 323 |
| 19 |   |   |   | -136 | -51 | 24 | 89 | 144 | 189 | 224 | 249 | 264 | 269 | 264 | 249 | 224 | 189 | 144 | 89 | 24 | -51 | -136 |   |   |   | 2261 |
| 21 |   |   | -171 | -76 | 9 | 84 | 149 | 204 | 249 | 284 | 309 | 324 | 329 | 324 | 309 | 284 | 249 | 204 | 149 | 84 | 9 | -76 | -171 |   |   | 3059 |
| 23 |   | -42 | -21 | -2 | 15 | 30 | 43 | 54 | 63 | 70 | 75 | 78 | 79 | 78 | 75 | 70 | 63 | 54 | 43 | 30 | 15 | -2 | -21 | -42 |   | 805 |
| 25 | -253 | -138 | -33 | 62 | 147 | 222 | 287 | 342 | 387 | 422 | 447 | 462 | 467 | 462 | 447 | 422 | 387 | 342 | 287 | 222 | 147 | 62 | -33 | -138 | -253 | 5175 |

COLOR DETECTING APPARATUS FOR INSPECTING A COLOR OF A PRINTED MATTER

BACKGROUND OF THE INVENTION

1. Field of the Invention

The present invention relates in general to color detecting. More specifically, the invention is directed to a color detecting apparatus for inspecting a color of printed matter, for example, in identification or quality inspection.

2. Description of the Related Art

Conventional apparatus for color inspecting printed matter uses RGB color image input means having a color glass filter a multilayer film coating color filter, and a gelatin coloring filter.

However, the RGB color image input means only separates three colors. It cannot detect a fine difference between waves having wavelengths of similar spectrum sensitivity characteristics., for example. This color image input means has a problem that a stroke of a wavelength exists between color filters because wavelength bands of the filters are designed in compliance with human visual characteristics, and therefore, a fine difference between spectrum wavelengths in the range of the wavelength stroke.

SUMMARY OF THE INVENTION

An object of the present invention is to provide a color detecting apparatus, which are capable of securely detecting a difference between colors caused due to accuracy of wavelength directions, and which enable color inspection with a high accuracy.

A color detecting apparatus according to the present invention comprises: inputting means for decomposing light from an inspection target object into a plurality of different wavelength components, and for inputting the wavelength components as spectrum data; first storing means for storing the spectrum data inputted by the inputting means; means for calculating out a physical characteristic amount of the spectrum data stored in the first storing means; second storing means for storing reference data to be used as reference for the characteristic amount of the spectrum data; and means for comparing the characteristic amount with the reference data so as to determine whether or not a color of the inspection target object is a reference color.

According to the structure as described above, the present invention inspects based on a plurality of kinds of wavelength components, unlike conventional inspection in which determination as to an inspection target object is made based only on information concerning three colors. Besides, a characteristic amount relating to a maximal value of spectrum data is calculated and compared with a reference value, to determine the color of an inspection target object. Therefore, the identification accuracy concerning colors is greatly improved in comparison with a conventional apparatus, and a fine difference between colors caused due to the accuracy of the wavelength directions can be securely detected.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram showing a structure of a color detecting apparatus according to a first embodiment of the present invention;

FIG. 8 is a graph explaining top end position detection performed on the inspection target object shown in FIG. 6;

FIG. 9 is a graph explaining the reason why a maximal value is used;

FIG. 10 is a graph explaining the number of maximal values;

FIG. 11 is a graph explaining wavelengths with respect to maximal values;

FIG. 12 is a graph explaining maximal values;

FIG. 13 is a block diagram showing a structure of a color detecting apparatus according to a second embodiment;

FIG. 14 is a graph explaining the reason why a peak is used;

FIG. 15 is a graph explaining the number of peaks;

FIG. 20 is a block diagram showing a structure of a color detecting apparatus according to a third embodiment of the present invention;

FIG. 22 is a graph explaining the number of inflection points;

FIG. 23 is a graph explaining wavelengths with respect to inflection points;

FIG. 24 is a block diagram showing a structure of a color detecting apparatus according to a fourth embodiment of the present invention;

FIG. 26 is a block diagram showing a structure of a color detecting apparatus according to a sixth embodiment of the present invention;

FIG. 27 is a block diagram showing a structure of a color detecting apparatus according to a seventh embodiment of the present invention;

FIG. 31 is a block diagram explaining a structure of a color detecting apparatus according to a ninth embodiment of the present invention;

FIG. 32 is a table showing balancing weight coefficients according to secondary and tertiary polynomial adaptation;

DETAILED DESCRIPTION OF THE PREFERRED EMBODIMENTS

In the following, embodiments of the present invention will be explained with reference to the drawings.

A first embodiment will now be explained.

FIG. 1 shows a structure of a color detecting apparatus according to the first embodiment of the present invention. In FIG. 1, a CPU (Central Processing Unit) 11 which performs control of the entire apparatus and detection processing on colors is connected with a reference data storage portion 13 as a reference data storage means, a determine portion 14 as a determination means, and a maximal characteristic calculation portion 25 as a characteristic amount calculation means, through an address bus AB and a data bus DB.

Meanwhile, a color printed matter P as an inspection target object having a color data is fed in the arrow direction in the figure by a feed means. Light is irradiated onto the printed matter thus fed. The light reflected by the surface of the printed matter P is received by a spectrum input device 20 and is subjected to spectrum distribution.

Figure 2:
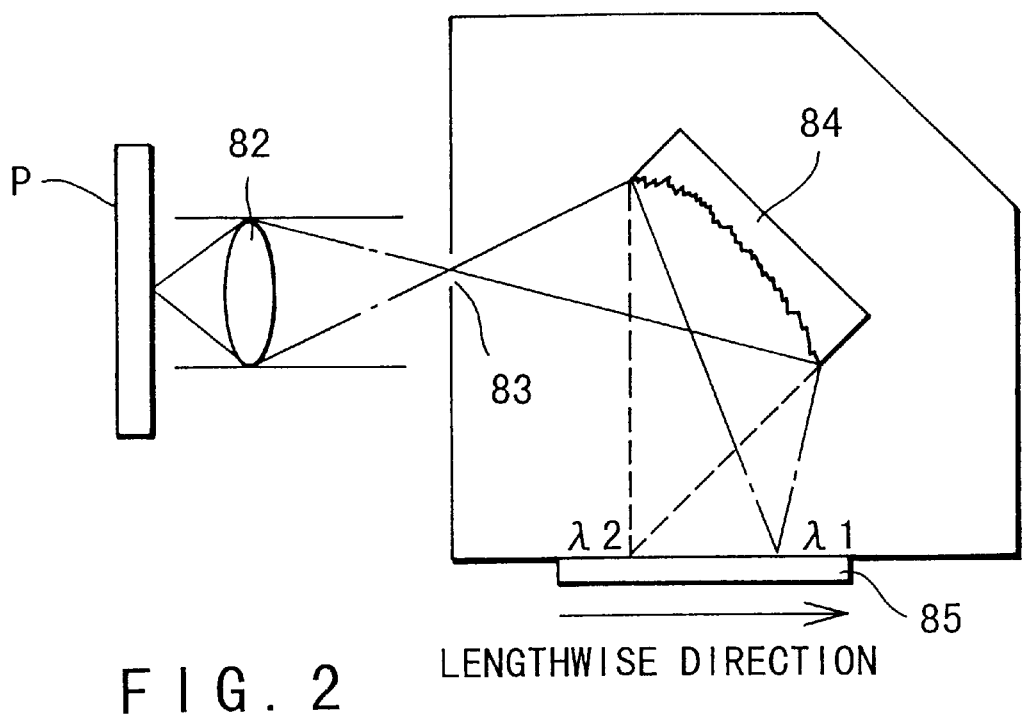
FIG. 2 is a view schematically showing a structure of a spectrum input device.

The spectrum input device 20 is, for example, constructed as shown in FIG. 2, and a diffraction grating spectrometer is cited here in this example. For example, a linear image sensor comprising 256 pixels is used as a light-receive element of the spectrometer. Specifically, light reflected by the inspection target object is collected by a lens 82, and enters into a diffraction grating 84. The light thus entering is spectrally distributed into spectrums of a plurality of wavelength components respectively oriented at corresponding angles, and the spectrum of each wavelength component is imaged on a light-receive surface of an image sensor 85. The image sensor 85 is driven in accordance with a drive signal from a sensor drive circuit 22.

Figure 3:
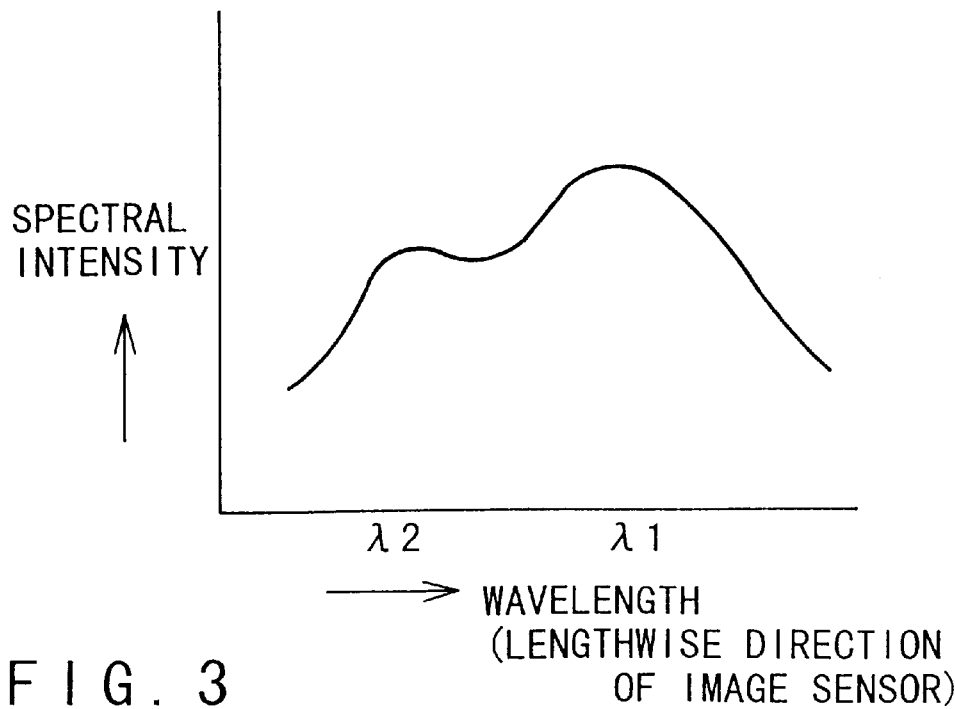
FIG. 3 is a view showing a state of image formation on an image sensor in a spectrum input device.

FIG. 3 shows an image formation state on the image sensor 85, and the lateral axis in the figure represents the lengthwise direction of the image sensor 85, which corresponds to a wavelength axis. The longitudinal axis in the figure represents an output value of each pixel of the image sensor 85, which corresponds to the intensity of light. In this case, the output of each pixel is decided by dividing the intensity of light reflected with respect to 400 nm to 750 nm of the inspection target object P, into unit distances of about 2 nm.

The reflected light imaged on the light receive surface of the image sensor 85 is subjected to photoelectrically converted into electric signals corresponding to each of the wavelength components. The electric signals thus obtained by conversion are read out in accordance with signals from the sensor drive circuit 22, and are converted into digital image signals (or spectrum data), for every wavelength component, by an A/D convert circuit 23 as an A/D convert means. In this case, the spectrum intensity is digitally divided into 256 levels if an 8-bit convert circuit is used as the A/D convert circuit 23.

Each output of the A/D convert circuit 23 is written into a memory 24 as a storage means, in synchronization with signals from the sensor drive circuit 22. The memory 24 is, for example, a RAM (Random Access Memory). When spectrum data is read from the memory 24, a two-dimensional array is used as shown in FIG. 4.

Figure 4:
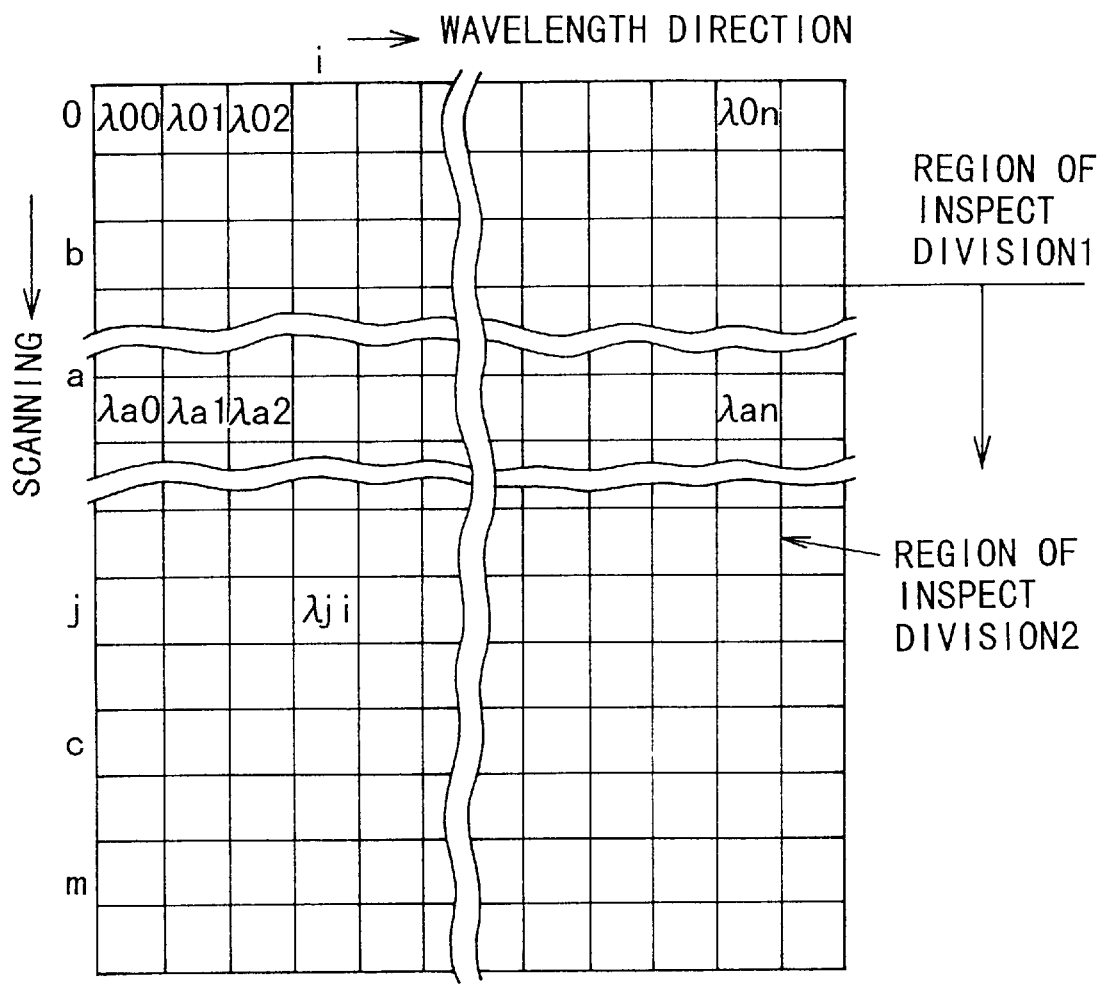
FIG. 4 is a view showing a state of data storage in a memory.

FIG. 4 shows an example where a number i in the lateral direction represents a wavelength and a scanning degree j is represented in the longitudinal direction. For example, when an address (i, j)=(3, 6) is called, the intensity data of the third wavelength in the sixth scanning is obtained.

A maximal value characteristic calculate portion 25 performs a calculation as will be described below, in accordance with a command from the CPU 11, to obtain a characteristic amount relating to a maximal value. For example, a DSP (Digital Signal Processor) is used as the calculate portion 25.

A determinate portion 14 compares a plurality of characteristic values obtained by the maximal value characteristic amount calculate portion 25 with reference data stored in the reference data storage portion 13, in accordance with a command from the CPU 11, to perform color inspection, and outputs an inspection result through an output portion 12.

Figure 5:
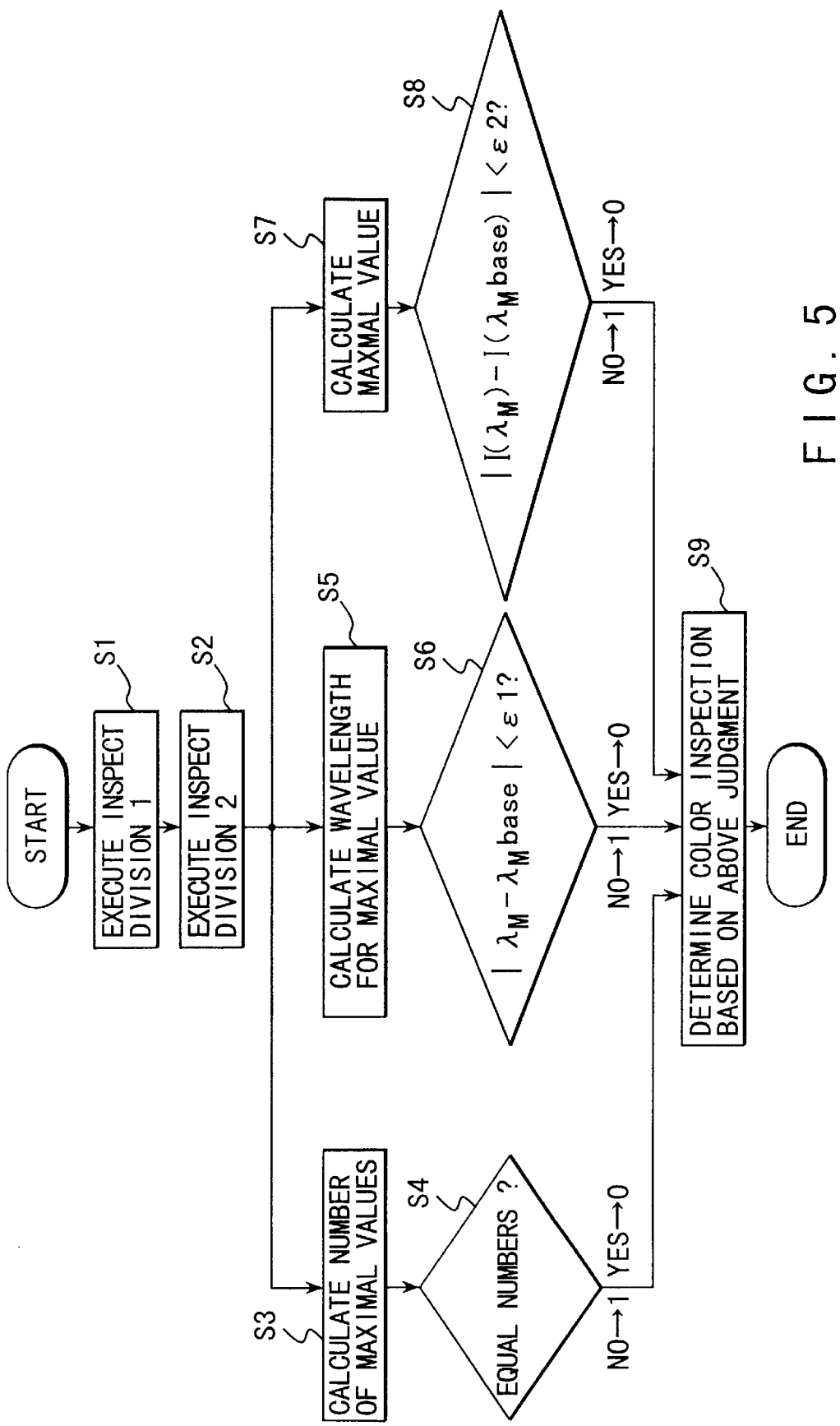
FIG. 5 is a flowchart explaining color inspection processing according to the first embodiment.

Next, color inspection processing will be explained with reference to a flow chart shown in FIG. 5. An inspection target object P is a printed matter in which a rectangular pattern 18 is printed on a white paper sheet 17, as shown in FIG. 7.

At first, an inspection region (y0<y) is extracted from spectrum data stored in the memory 24. This region corresponds to an address which satisfies a condition (j>b), referred to the storage state of the memory 24 shown in FIG. 4. In this case, the position where the intensity is equal to or higher than a threshold value "100" predetermined with use of the intensity of a particular wavelength λ128 is decided as the top end position of the inspection target object P, as shown in FIG. 8 (step S1).

Figure 7:
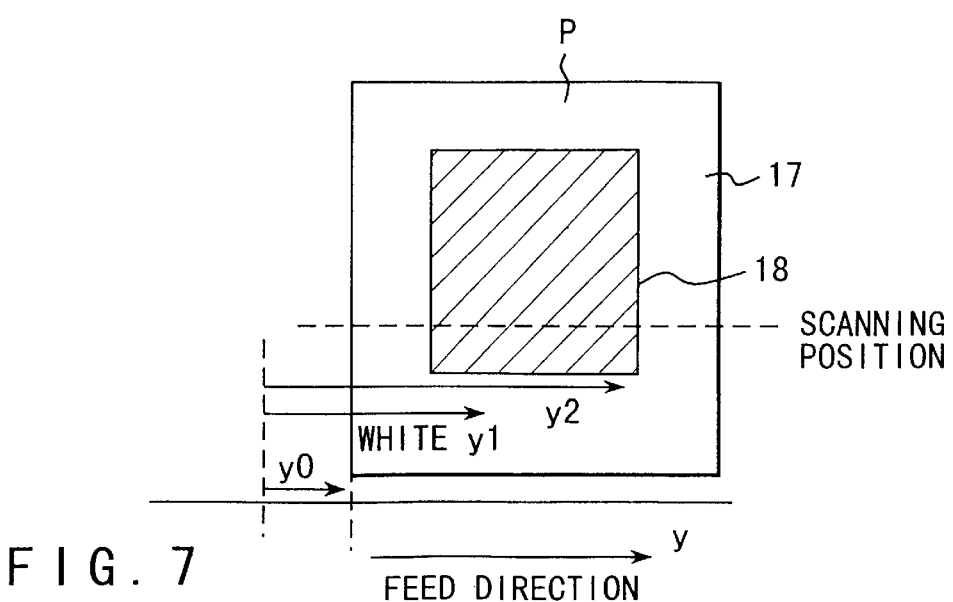
FIG. 7 is a graph showing a practical example of an inspection target object.

In step S2, only the pixels within a predetermined range (y1<y<y2) are extracted as shown in FIG. 7. This range corresponds to an address which satisfies a condition (a<j<c), referred to the storage state of the memory 24 shown in FIG. 4.

Next, the following calculation is performed on data of each pixel. This calculation is carried out in the maximal value characteristic amount calculate portion 25.

The number of maximal values of spectrum characteristics are obtained as a characteristic amount (in step S3). Here, the maximal values are used because the spectrum characteristic is considered as layered spectrum distributions around a particular wavelength as the center and is therefore suitable for discriminating a mixed substance which has a different spectrum distribution.

The following explains a method for obtaining the number of maximal values. At first, an inclination D (($\lambda_i+\lambda_i+1$)/2) between a wavelength $\lambda_i$ and a wavelength $\lambda_i+1$, by the following equation. Here, the wavelength $\lambda_i$ is a sample number of spectrum data.

$$D((\lambda_i+\lambda_i+1)/2)=(I(\lambda_i+1)-(\lambda_i))/(\lambda_i+1-\lambda_i) \quad (1)$$

where $I(\lambda_i)$ is an intensity of spectrum data corresponding to a wavelength $\lambda_i$.

Next, the number of values of i which satisfy the condition expressed in the following relations (2) is obtained.

$$D((\lambda_i+\lambda_i+1)/2)\times D((\lambda_i+2+\lambda_i+1)/2)<0$$

and $$D((\lambda_i+\lambda_i+1)/2)>0 \quad (2)$$

The number of values i is taken as the number of maximal values, and is compared with the reference data (i.e., a reference maximal value) stored in the reference data storage portion 13 by the determine portion 14. If the number of values i is equal to the reference data, a signal "0" is outputted. If not, a signal "1" is outputted (in a step S4). According to this inspection, it is possible to identify a fine difference between waveforms a and b in FIG. 10, e.g., a difference between waveforms a and b which respectively have two and three maximal values.

Next, a wavelength with respect to a maximal value of a spectrum characteristic is obtained as a characteristic amount (in a step S5). The following explains a method of obtaining a wavelength with respect to a maximal value. At first, a calculation as expressed in the following equation (3) is carried out to obtain to obtain a wavelength with respect to a maximal value.

$$\lambda=\lambda'_i+(\lambda'_i+1-\lambda'_i)\cdot D(\lambda'_i)/(-D(\lambda'_i+1)+D(\lambda'_i)) \quad (3)$$

where $$\lambda'_i=(\lambda_i+\lambda_i+1)/2$$

Next, in the determine portion 14, wavelengths are compared with reference data (i.e., reference maximal values) stored in the reference data storage portion 13, for example, in an order from a smaller wavelength. If all the wavelengths with respect to maximal values have a relationship as will described below in a relation (4), with the wavelengths with respect to the maximal values of the reference data, a signal "0" is outputted. If not, a signal "1" is outputted (in a step S6).

$$|\lambda_M-\lambda_{Mbase}|<\epsilon 1 \quad (4)$$

where $\lambda_M$: maximal values of inputted spectrum characteristic $\lambda_{Mbase}$: maximal values of reference data According to this inspection, for example, it is possible to identify a fine difference between waveforms a and b in FIG. 11, which have waveforms slightly different from each other with respect to their maximal values. Note that the threshold value $\epsilon 1$ can be changed by the CPU 11.

Next, maximal values of spectrum characteristics are obtained as characteristic amounts (step S7). The following explains a method of obtaining the maximal values. At first, the calculation of the following equation (5) is carried out with use of the results of the above equation (3), to obtain maximal values.

$$I(\lambda_M=1(\lambda'_i)+D((\lambda_i+\lambda_i-1)/2)\cdot(\lambda_M-\lambda'_i)$$

where $$\lambda'_i=(\lambda'_i+\lambda'_i+1)/2 \quad (5)$$

Next, the determine portion 14 compares the maximal values with the reference data (e.g., reference maximal values) stored in the reference data storage portion 13, for example, in an order from a smaller wavelength. If all the maximal values of inputted spectrum data have a relationship as described below in the relation (6), with maximal values of the reference data, a signal "0" is outputted. If not, a signal "1" is outputted (in a step S8).

$$|I(\lambda_M)-1(\lambda_{Mbase})|<\epsilon 2 \quad (6)$$

where $I(\lambda_M)$: maximal values of inputted spectrum characteristics $I(\lambda_{Mbase})$: maximal values of reference data According to this inspection, it is possible to identify a fine difference between maximal values of waveforms a and b shown in FIG. 12. Note that $\epsilon 2$ can be changed by the CPU 11.

Figure 6:
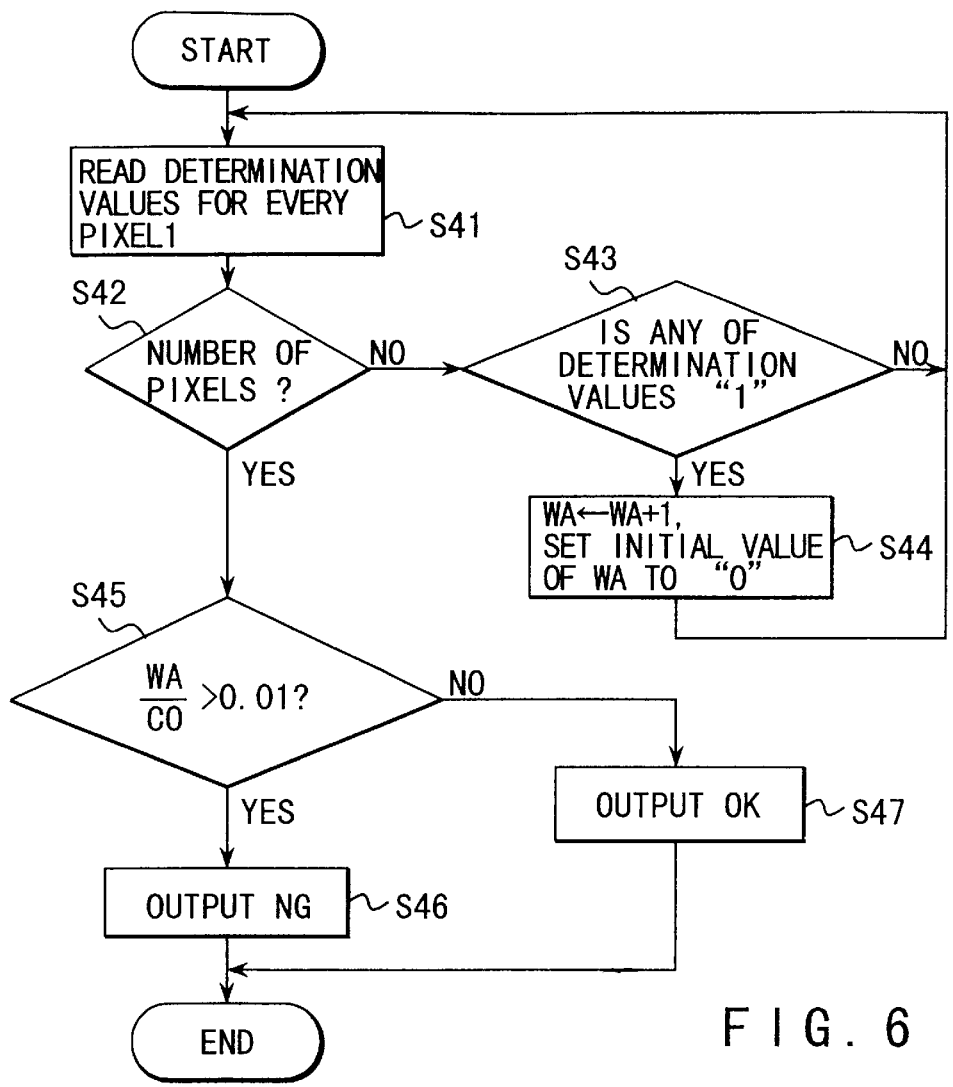
FIG. 6 is a flowchart explaining color inspection determination processing.

Next, the determine portion 14 performs color inspection determination (in a step S9), on the basis of determination values using characteristic amounts independent from each other, which are respectively obtained through operations of the steps S3 to S8. This color inspection determination is carried out in accordance with the flowchart shown in FIG. 6. Specifically, determination values (1 or 0) obtained through the steps S4, S6, and S8 are read for every one of pixels (in a step S41). If the number of pixels whose determination values have thus read does not reach a predetermined value K which is a total pixel number of one sample (in a step S42), whether or not the determination values include one "1" (in a step S43) is checked.

If all the determination values are determined to be "0" as a result of this checking, the processing returns to the step S41 and the processing on a next pixel is started. If any one of the determination values is "1", the value of a counter WA is added with "+1" (in a step S44), the processing returns to the step S41, and the processing on a next pixel is started.

If the number of pixels whose determination values have been read reaches the predetermined value K in the step S42, whether or not the ratio of the value of the counter WA to the total pixel number CO of an inspection region is greater than a determination reference value is checked (in a step S45). In this case, whether or not the ratio is greater than 1% (0.01) is checked. If the ratio is greater than the determination reference value, a determination result of NG (which means that the color of the sample is not the same as the reference) is outputted (in a step S46). If the ratio is smaller than the determination reference value, a determination result of OK (which means that the color of the sample is the same as the reference) is outputted (in a step S47). This determination result is outputted to the outside by an output circuit 12.

In the next, a second embodiment will be explained.

FIG. 13 shows a structure of a color detecting apparatus according to a second embodiment. The second embodiment has the same structure and operation as the first embodiment, except that a peak characteristic amount calculate portion 26 is used as a characteristic amount calculate means in the second embodiment.

The peak characteristic amount calculate portion 26 performs calculations as will be described below, in accordance with commands from the CPU 11, to obtain a characteristic amount with respect to a peak. For example, a DSP is used as the peak characteristic amount calculate portion 26.

Here, a "peak" indicates a projecting portion such as $\lambda_1$, $\lambda_2$, or $\lambda_3$, and is used in the meaning different from the maximal value. Characteristic amounts relating to peaks are used because there is a spectrum characteristic which cannot be identified with use of maximal values, like the peak of the wavelength $\lambda_3$, although a spectrum characteristic is considered as layered spectrum distributions around a particular wavelength as the center.

Figure 16:
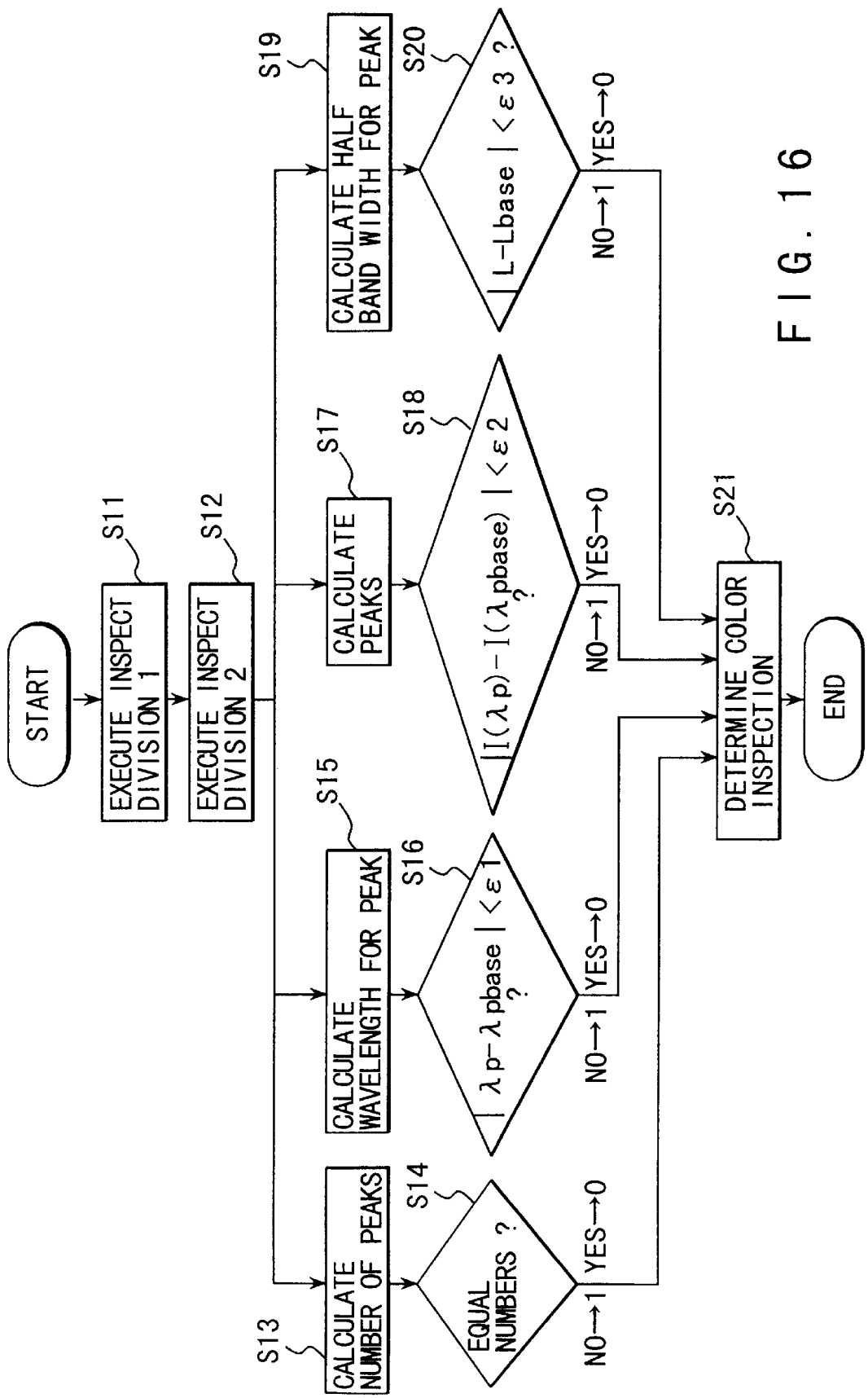
FIG. 16 is a flowchart explaining color inspection processing according to the second embodiment.

In the following, color inspection processing will be explained with reference to a flowchart shown in FIG. 16. Since the inspect division processing and the extract processing of an inspect region in steps S11 and S12 are the same as those of the first embodiment (e.g., the steps S1 and S2 in FIG. 5), explanation of these steps will be omitted herefrom and operation following these steps will be explained below.

At first, the number of peaks of a spectrum characteristic are obtained as a characteristic amount (in a step S13). The following explains a method of obtaining the number of peaks. An inclination D $((\lambda_i+\lambda_i+1)/2)$ of a spectrum curve between a wavelength $\lambda_i$ and a wavelength $\lambda_i+1$ is obtained by the following equation (7). Here, i of $\lambda_i$ denotes the sample number of color data.

$$D((\lambda_i+\lambda_i+1)/2 = (I(\lambda_i+1)-1(\lambda_i))/(\lambda_i+1-\lambda_i) \quad (7)$$

Further, a difference E $(\lambda_i)$ is obtained by the following equation (8).

$$E(\lambda_i)=D(\lambda'_i)\cdot D(\lambda'_i-1) \quad (8)$$

where $$\lambda'_i=(\lambda_i+\lambda_i+1)/2$$

Next, the number of values $\lambda_i$ which satisfies the condition described as the following relation (9) is obtained.

$$(E(\lambda_i)-E(\lambda_i-1))\cdot(E(\lambda_i+1)-E(\lambda_i))<0$$

and $$(E(\lambda_i)-E(\lambda_i-1))<0 \quad (9)$$

The number of these values i is taken as the number of peaks and is compared with the reference data (i.e., a reference peak number) stored in the reference data storage portion 13. If these numbers are equal to each other, a signal "0" is outputted. If not, a signal "1" is outputted (step S14). According to this inspection, it is possible to identify a fine difference between waveforms a and b in FIG. 15, e.g., a difference between waveforms a and b which respectively have two and three peaks.

Next, a wavelength with respect to a peak of a spectrum characteristic is obtained as a characteristic amount (in a step S15). The following explains a method of obtaining a wavelength with respect to a peak. At first, a calculation as expressed in the following equation (10) is carried out to obtain a waveform with respect to a peak.

$$\lambda_{P-\lambda_i}+(\lambda_i+1-\lambda_i)\cdot K \quad (10)$$

$$K=-F(\lambda_i)/-F(\lambda_i)/-F(\lambda'_i+F(\lambda_i+1)$$

where $$F(\lambda_i)=-E(\lambda_i)+E(\lambda_i+1)$$

Figure 17:
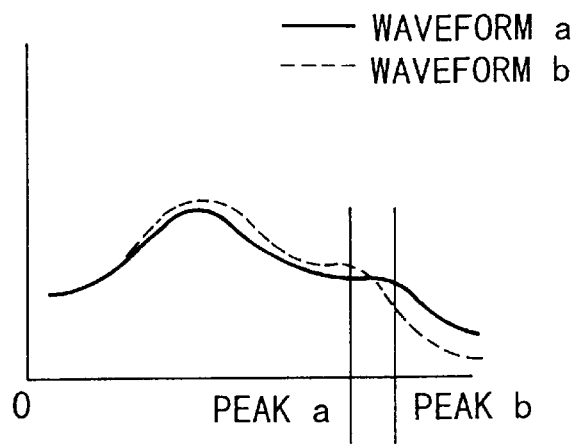
FIG. 17 is a graph explaining wavelengths with respect to peaks.

In the determine portion 14, wavelengths are compared with reference data (i.e., reference peak numbers) stored in the reference data storage portion 13, for example, in an order from a smaller wavelength. If all the peak values of inputted spectrum data have a relationship as will be described below in a relation (11), with the peaks of the reference data, a signal "0" is outputted. If not, a signal "1" is outputted (in a step S16).

$$|\lambda_P-\lambda_{Pbase}|<\epsilon1 \quad (11)$$

where $\lambda_P$: wavelength with respect to a peak of an inputted spectrum characteristic $\lambda_{Pbase}$: wavelength with respect to a peak of reference data According to this inspection, for example, it is possible to identify a fine difference between waveforms a and b in FIG. 17. Note that the threshold value $\epsilon1$ can be changed by the CPU 11.

Next, peaks of spectrum characteristics are obtained as characteristic amounts (step S17). The following explains a method of obtaining peaks. At first, the calculation expressed in the following equation (12) is carried out to obtain peak values I.

$$I=I(\lambda_i)+D(\lambda'_i)-(\lambda-\lambda_i) \quad (12)$$

$$\lambda'_i=(\lambda_i+\lambda_i+1)/2$$

where

Figure 18:
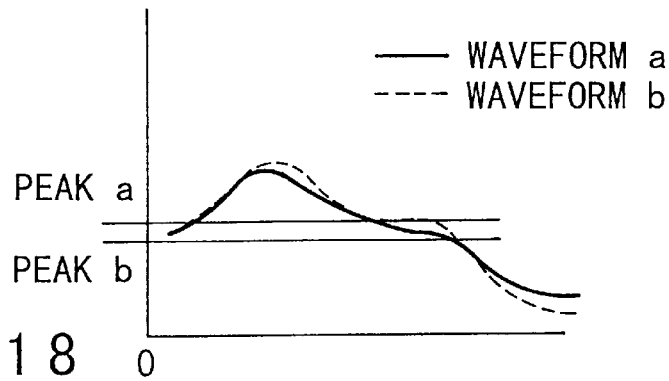
FIG. 18 is a graph explaining values of peaks.

Next, the determine portion 14 compares the peak values with the reference data (i.e., reference peak values) stored in the reference data storage portion 13, for example, in an order from a smaller wavelength. If all the peak values of inputted spectrum data have a relationship as described below in the relation (13), with peak values of the reference data, a signal "0" is outputted. If not, a signal "1" is outputted (step S18).

$$|I(\lambda_P)-1(\lambda_{Pbase})|<\epsilon2 \quad (13)$$

where $\lambda_P$: peak values of inputted spectrum characteristics $\lambda_{Pbase}$: peak values of reference data According to this inspection, it is possible to identify a fine difference between peak values of waveforms a and b shown in FIG. 18, for example. Note that $\epsilon2$ can be changed by the CPU 11.

In the next, half band widths of peaks of spectrum characteristics are obtained (step S19). The following explains a method of obtaining half band widths of peaks. At first, the result E $(\lambda_i)$ of the equation (8) is used to obtain $\lambda_i$ which satisfy the condition described in the following relation (14)

$$E(\lambda_i)\cdot E(\lambda_i+1)<0 \quad (14)$$

and $$D((\lambda_i+\lambda_i-1)/2)<0$$

Next, the calculation described in the following equation (15) is carried out to obtain inflection points.

$$\lambda_h=\lambda_i+K\cdot(\lambda_i+1-\lambda_i) \quad (15)$$

where $$k=|E(\lambda_i)|/E(\lambda_i)|+|E(\lambda_i+1)|)$$

Here, the half band width is defined as the distance to the most distant one of the inflection points which contain the wavelengths with respect to the peaks obtained by the relation (10).

The determine portion compare the half band widths of extracted data with reference data (i.e., reference half band widths) stored in the reference data storage portion 13. If the half band widths of extracted data all have a relationship as described below in the following relation (16) with the reference data, a signal "0" is outputted. If not, a signal "1" is outputted (step S20).

$$|L-L_{base}|<\epsilon 3 \tag{16}$$

where

Figure 19:
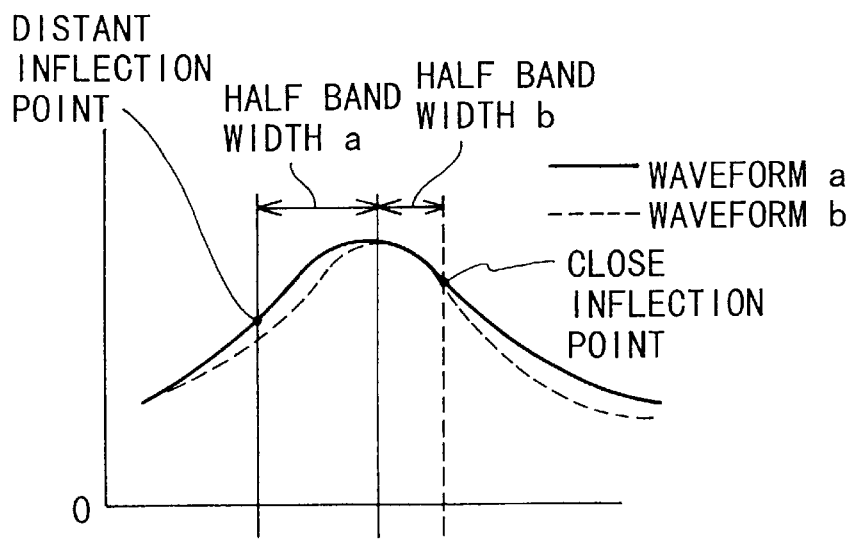
FIG. 19 is a graph explaining half band widths of peaks.

L: half band widths of inputted spectrum characteristics $L_{base}$: half band widths of reference data According to this inspection, it is possible to identify a difference between similar waveforms a and b as shown in FIG. 19, which respectively have different half band widths. Note that the threshold value $\epsilon 3$ can be changed by the CPU 11.

In the next, the determine portion 14 performs color inspection determination (step S21), on the basis of determination values using characteristic amounts independent from each other, which are respectively obtained through operations of the steps S13 to S20. This color inspection determination is carried out in accordance with the flowchart shown in FIG. 6, like the step S9 of FIG. 5 in the first embodiment. Therefore, detailed explanation of the color inspection determination will be omitted herefrom.

A third embodiment will now be explained.

FIG. 20 shows a structure of a color detecting apparatus according to a third embodiment. The third embodiment has the same structure and operation as the first embodiment, except that an inflection point characteristic amount calculate portion 27 is used as a characteristic amount calculate means in the third embodiment.

The inflection point characteristic amount calculate portion 27 performs calculations as will be described below, in accordance with commands from the CPU 11, to obtain a characteristic amount with respect to an inflection point. For example, a DSP is used as the inflection point characteristic amount calculate portion 27.

Figure 21:
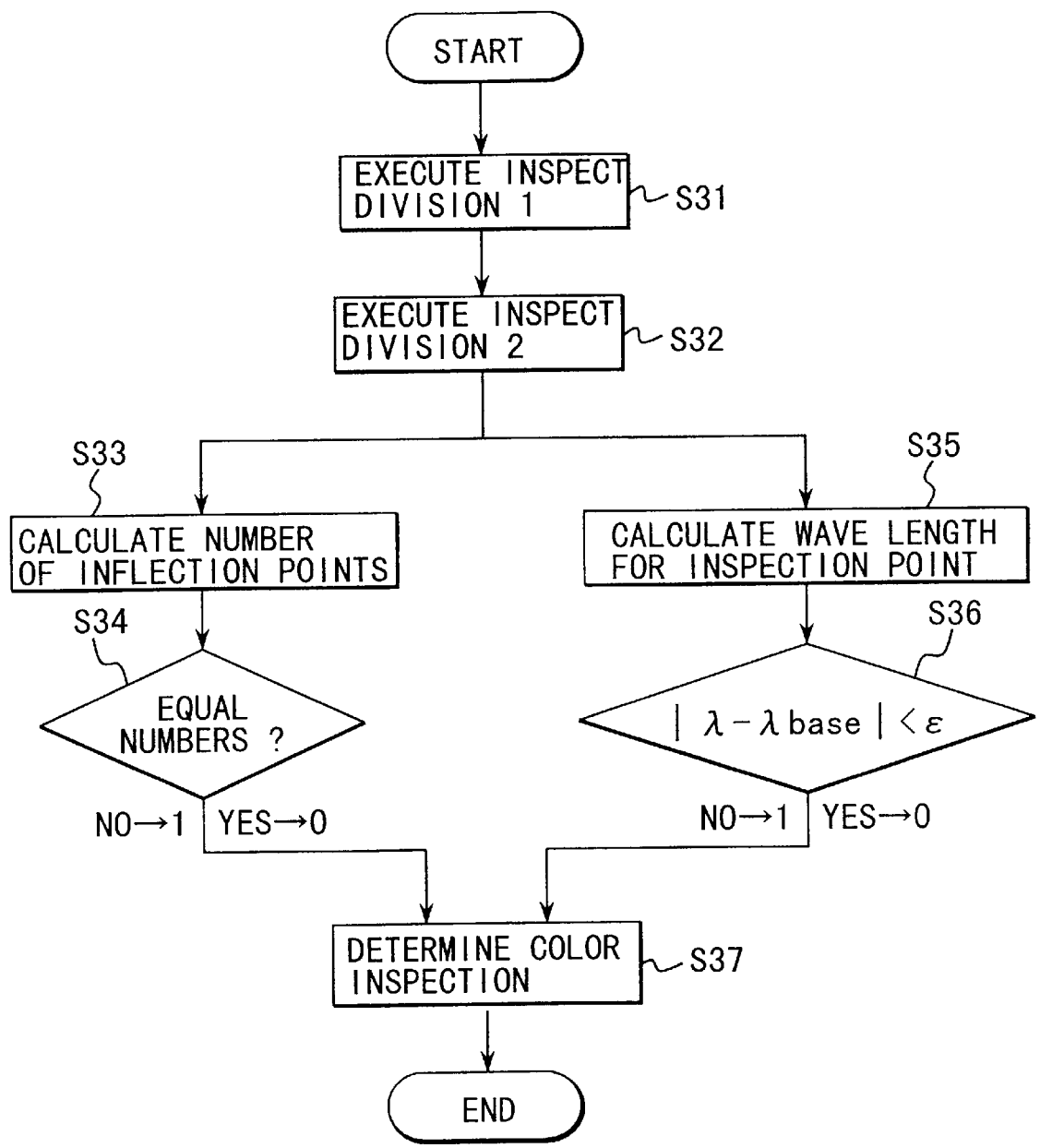
FIG. 21 is a flowchart explaining color inspection processing according to a third embodiment.

In the following, color inspection processing will be explained with reference to a flowchart shown in FIG. 21. Since the inspect division processing and the extraction processing of an inspect region in steps S11 and S12 are the same as those of the first embodiment (e.g., the steps S1 and S2 in FIG. 5), explanation of these steps will be omitted herefrom and operation following these steps will be explained below.

At first, the number of inflection points of a spectrum characteristic are obtained as a characteristic amount (step S33). The following explains a method of obtaining the number of inflection points. An inclination D $((\lambda_i+\lambda_i+1)/2)$ of a spectrum curve between a wavelength $\lambda_i$ and a wavelength $\lambda_i+1$ is obtained by the following equation (17).

$$D((\lambda_i+\lambda_i+1)/2)=(I(\lambda_i+1)\cdot I(\lambda_i))/(\lambda_i+1-\lambda_i) \tag{17}$$

Further, a difference E ($\lambda_i$) is obtained by the following equation (18).

$$E(\lambda_i)=D(\lambda'_i)-D(\lambda'_i-1) \tag{18}$$

where $\lambda'_i=(\lambda_i+\lambda_i+1)/2$

In the next, the number of values $\lambda_i$ which satisfy the condition described in the following relation (19) is obtained.

$$E(\lambda_i)\cdot E(\lambda_i+1)<0 \tag{19}$$

The number of values i which satisfy the condition expressed by the relation (19) is taken as the number of inflection points. The determine portion compares this number with the reference data (i.e., a reference inflection point number) stored in the reference data storage portion 13. If these numbers are equal to each other, a signal "0" is outputted. If not, a signal "1" is outputted (step S14).

According to this inspection, it is possible to identify a fine difference between waveforms a and b as shown in FIG. 22, which respectively have two and three inflection points.

Next, a wavelength with respect to an inflection point of a spectrum characteristic is obtained as a characteristic amount (in a step S35). The following explains a method of obtaining a wavelength with respect to an inflection point. At first, a wavelength $\lambda_h$ is obtained by the following equation (20), and the obtained wavelength $\lambda_h$ is taken as the position of the inflection point.

$$\lambda_h=\lambda_i+k\cdot(\lambda_i+1-\lambda_i) \tag{20}$$

where $K=|E(\lambda_i)|/(1E(\lambda_i)|+|E(\lambda_i+1)|)$

In the determine portion 14, wavelengths are compared with reference data (i.e., wavelengths with respect to inflection points) stored in the reference data storage portion 13. If the wavelengths are contained within the range of a threshold value $\epsilon$, a signal "0" is outputted. If not, a signal "1" is outputted (step S36).

$$|\lambda-\lambda_{base}|<\epsilon \tag{21}$$

where $\lambda$: half band widths of inputted spectrum characteristics $\lambda_{base}$: half band widths of reference data According to this inspection, for example, it is possible to identify a fine difference between wavelength a and b with respect to inflection points as shown in FIG. 23. Note that the threshold value $\epsilon$ can be changed by the CPU 11.

In the next, the determine portion 14 performs color inspection determination (step S37), on the basis of determination values using characteristic amounts independent from each other, which are respectively obtained through operations of the steps S33 to S36. This color inspection determination is carried out in accordance with the flowchart shown in FIG. 6, like the step S9 of FIG. 5 in the first embodiment. Therefore, detailed explanation of the color inspection determination will be omitted herefrom.

A fourth embodiment will now be explained.

FIG. 24 shows a structure of a color detecting apparatus according to a fourth embodiment. The fourth embodiment has the same structure and operation as the first embodiment, except that in the fourth embodiment, a work memory 15 and a preprocessing portion 28 as a correct means are added.

In the fourth embodiment, spectrum data is corrected with use of the preprocessing portion 28. The maximal value characteristic amount calculate portion 25 uses the corrected spectrum data to calculate a characteristic amount relating to a maximal value of a spectrum waveform.

In this embodiment, smoothing is introduced as preprocessing (or correction) of spectrum waveform analysis in the preprocessing portion 28. The operation of the smoothing is advantageous in that noise in spectrum data is reduced. The following explains the smoothing. Here, it is supposed that the output of each sample point i is expressed by a quadratic equation (22) as follows. Note that the following equation (22) is developed from a point i as a center to a point 2m+1.

$$y(j)=a(j-i)2+b(j-i)+c:j=-m+1,\ldots-1+1,i,i+1,\ldots m+i \tag{22}$$

Here, a square of the difference between y(j) and an actual output value x(i) is obtained, and the coefficients a, b, and c of the quadratic equation which minimizes the result of the square are calculated by a method of least square.

$$\sum_{j=-m+i}^{m+i} \{X(j) - y(j)\}^2 \quad (23)$$

In this state, the approximate function at the point i can be expressed as y(i) with use of secondary and tertiary polynomial adaptation shown in FIG. 32 and the following equation (24).

$$y(i) = \sum_{j=-m}^{m} X(i+j)W(j)/W \quad (24)$$

$$W = \sum_{j=-m}^{m} W(j)$$

The approximated spectrum waveforms at respective sample points are written again into the work memory 15. The maximal value characteristic amount calculate portion 25 uses the spectrum data in the work memory 15 to obtain characteristic amounts concerning maximal values, as characteristic amounts. The method of obtaining these characteristic amounts is the same as that used in the first embodiment. Inclinations of spectrum curves are obtained by a difference in the first embodiment. In the fourth embodiment, however, inclinations can be obtained by differentiation for each wavelength. The other processing manners of the fourth embodiment are the same as those of the first embodiment.

A fifth embodiment will now be explained.

Figure 25:
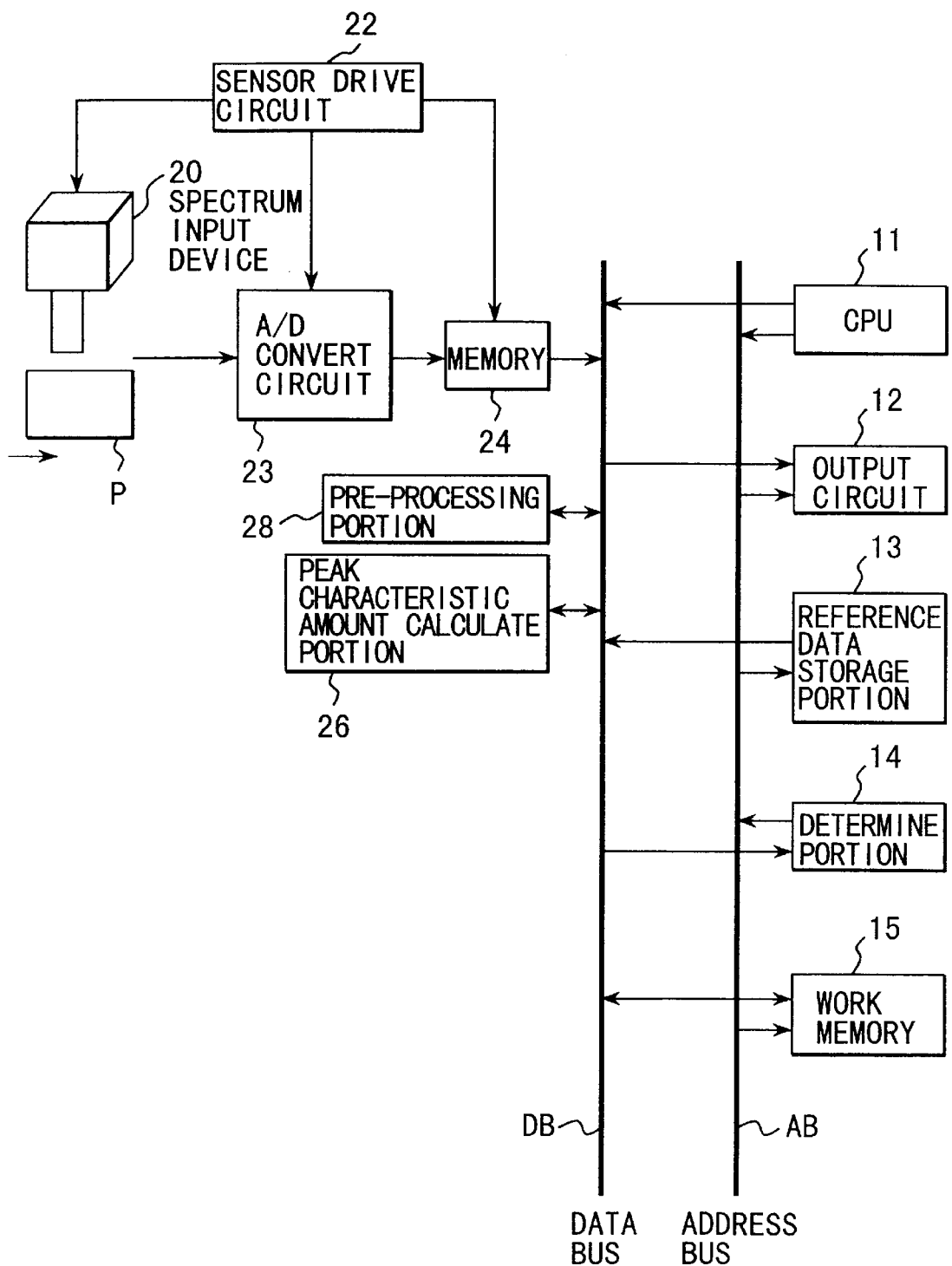
FIG. 25 is a block diagram showing a structure of a color detecting apparatus according to a fifth embodiment of the present invention.

FIG. 25 shows a structure of a color detecting apparatus according to a fifth embodiment of the present invention. The fifth embodiment has the same structure and operation as the second embodiment, except that in the fifth embodiment, a work memory 15 and a preprocessing portion 28 as a correct means are added.

In the fifth embodiment, spectrum data is corrected with use of the preprocessing portion 28. The peak characteristic amount calculate portion 26 uses the corrected spectrum data to calculate a characteristic amount relating to a peak of a spectrum waveform. The method of calculation is the same as that used in the second embodiment. In the fifth embodiment, calculations can be performed by differentiation for each wavelength, like in the fourth embodiment. The other processing manners are the same as those of the second embodiment.

A sixth embodiment will now be explained.

FIG. 26 shows a structure of a color detecting apparatus according to a sixth embodiment of the present invention. The sixth embodiment has the same structure and operation as the third embodiment, except that in the sixth embodiment, a work memory 15 and a preprocessing portion 28 as a correct means are added.

In the sixth embodiment, spectrum data is corrected with use of the preprocessing portion 28. The inflection point characteristic amount calculate portion 27 uses the corrected spectrum data to calculate a characteristic amount relating to an inflection point of a spectrum waveform. The method of calculation is the same as that used in the third embodiment. In the sixth embodiment, calculations can be performed by differentiation for each wavelength, like in the fourth embodiment. The other processing manners are the same as those of the third embodiment.

According to the fourth to sixth embodiments, it is possible to carry out color inspection less influenced by noise, than in case of obtaining the inclination of a spectrum curve by a difference.

A seventh embodiment will now be explained below.

FIG. 27 shows a structure of a color detecting apparatus according to a seventh embodiment of the present invention. The seventh embodiment has the same structure and operation as the first embodiment, except that in the seventh embodiment, a differential circuit 21 as a differential means is added.

In the seventh embodiment, an inputted spectrum signal is subjected to a difference calculation, by the differential circuit 21, and is thereafter subjected to A/D conversion. The maximal characteristic value characteristic amount calculate portion 25 uses spectrum data obtained by the A/D conversion, to calculate characteristic amounts relating to maximal values of spectrum waveforms. The method of calculation is the same as that used in the first embodiment.

Figure 28:
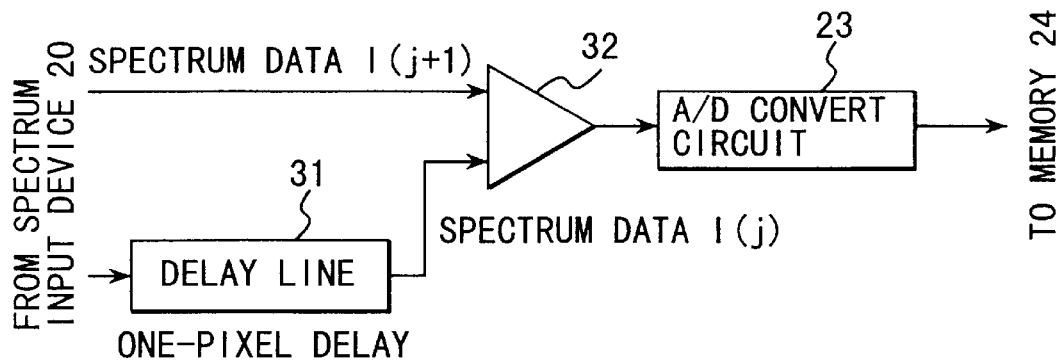
FIG. 28 is a block diagram explaining a differential circuit in the seventh embodiment.
Figure 29:
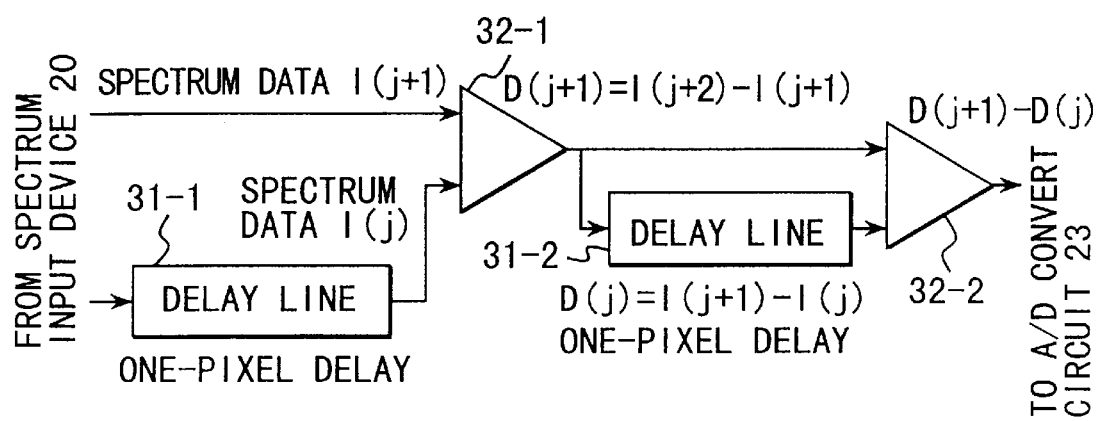
FIG. 29 is a block diagram explaining another differential circuit in the seventh embodiment.

Here, the differential circuit 21 will be explained. An analogue signal (or a spectrum signal obtained) from the spectrum input device 20 is made pass through a delay line circuit 31, as shown in FIG. 28, and is thereby delayed by one pixel. Thereafter, a difference between the delayed signal and a preceding pixel is obtained. Further, the output of a difference amplifier 32 is subjected to A/D conversion by an A/D convert circuit 23, to obtain spectrum data. Color inspection is carried out by obtaining a characteristic amount relating to a maximal value is obtained with use of the spectrum data.

Note that the differential circuit 21 may be provided in the output side of the A/D convert circuit 23, in place of the input side thereof. If two delay line circuits 311 and 312 as well as two differential amplifiers 321 and 322 are provided, it is possible to carry out difference calculations for two or more times, thereby to perform inspection which requires a difference calculation for two or more times, as in the second and third embodiments.

The eighth embodiment will be explained in the following.

Figure 30:
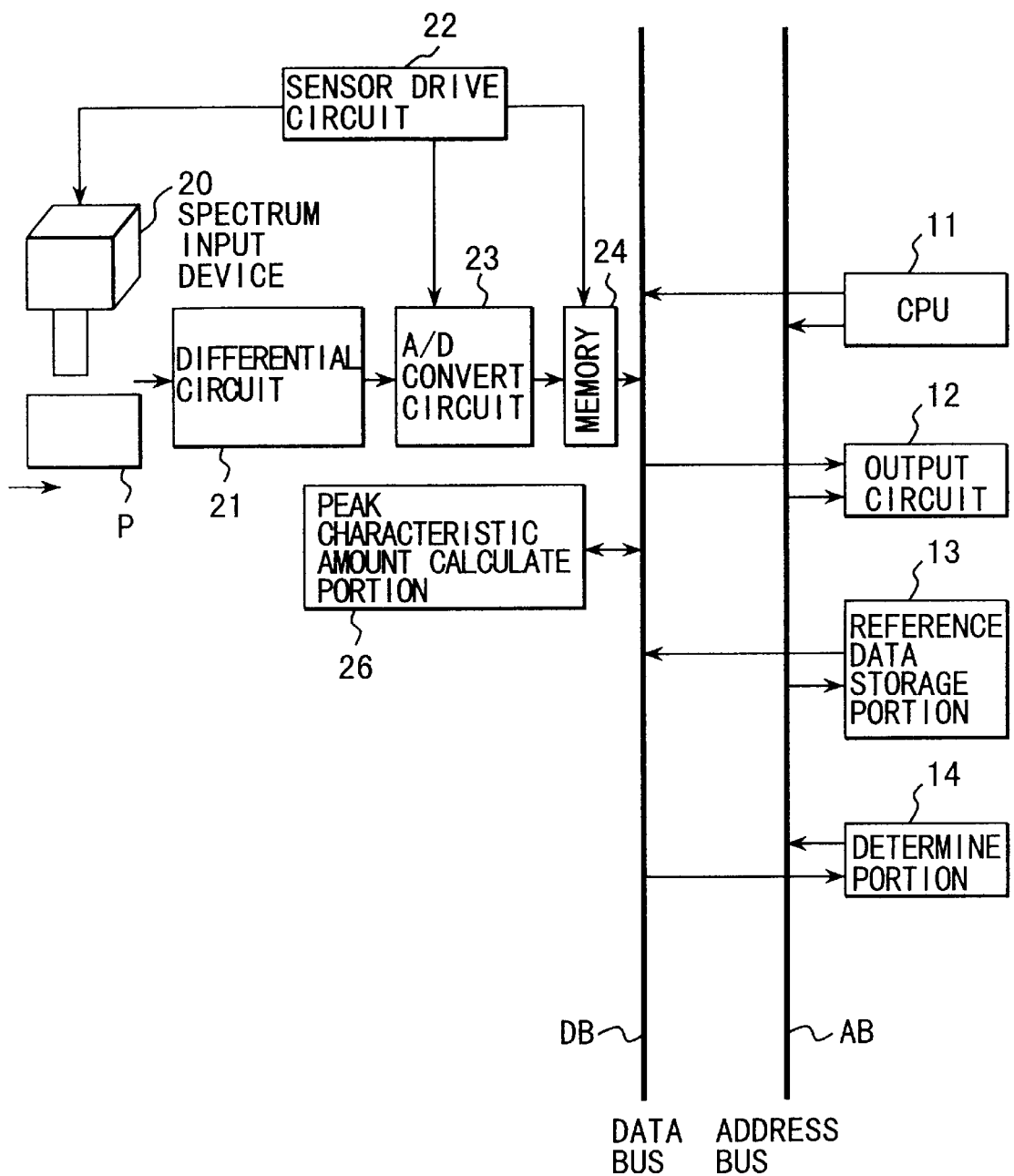
FIG. 30 is a block diagram explaining a structure of a color detecting apparatus according to an eighth embodiment of the present invention.

FIG. 30 shows a structure of a color detecting apparatus according to an eighth embodiment of the present invention. The eighth embodiment has the same structure and operation as the second embodiment, except that in the eighth embodiment, a differential circuit 21 as a differential means is added.

An inputted spectrum signal is subjected to a difference calculation, by the differential circuit 21, and is thereafter subjected to A/D conversion. The peak characteristic amount calculate portion 26 uses spectrum data obtained by the A/D conversion, to calculate characteristic amounts relating to peaks of spectrum waveforms. The method of calculation is the same as that used in the second embodiment. The differential circuit 21 is the same as that used in the seventh embodiment.

A ninth embodiment will now be explained in the following.

FIG. 31 shows a structure of a color detecting apparatus according to a ninth embodiment of the present invention. The ninth embodiment has the same structure and operation as the third embodiment, except that in the ninth embodiment, a differential circuit 21 as a differential means is added.

In the eighth embodiment, an inputted spectrum signal is subjected to a difference calculation, by the differential circuit 21, and is thereafter subjected to A/D conversion. The inflection point characteristic amount calculate portion 27 uses spectrum data obtained by the A/D conversion, to calculate characteristic amounts relating to inflection points of spectrum waveforms. The method of calculation is the same as that used in the third embodiment. The differential circuit 21 is the same as that used in the seventh embodiment.

According to the seventh to ninth embodiments described above, differences between input signals are obtained, so that data amounts are reduced and the processing time is shortened.

A tenth embodiment will now be explained below.

Figure 33:
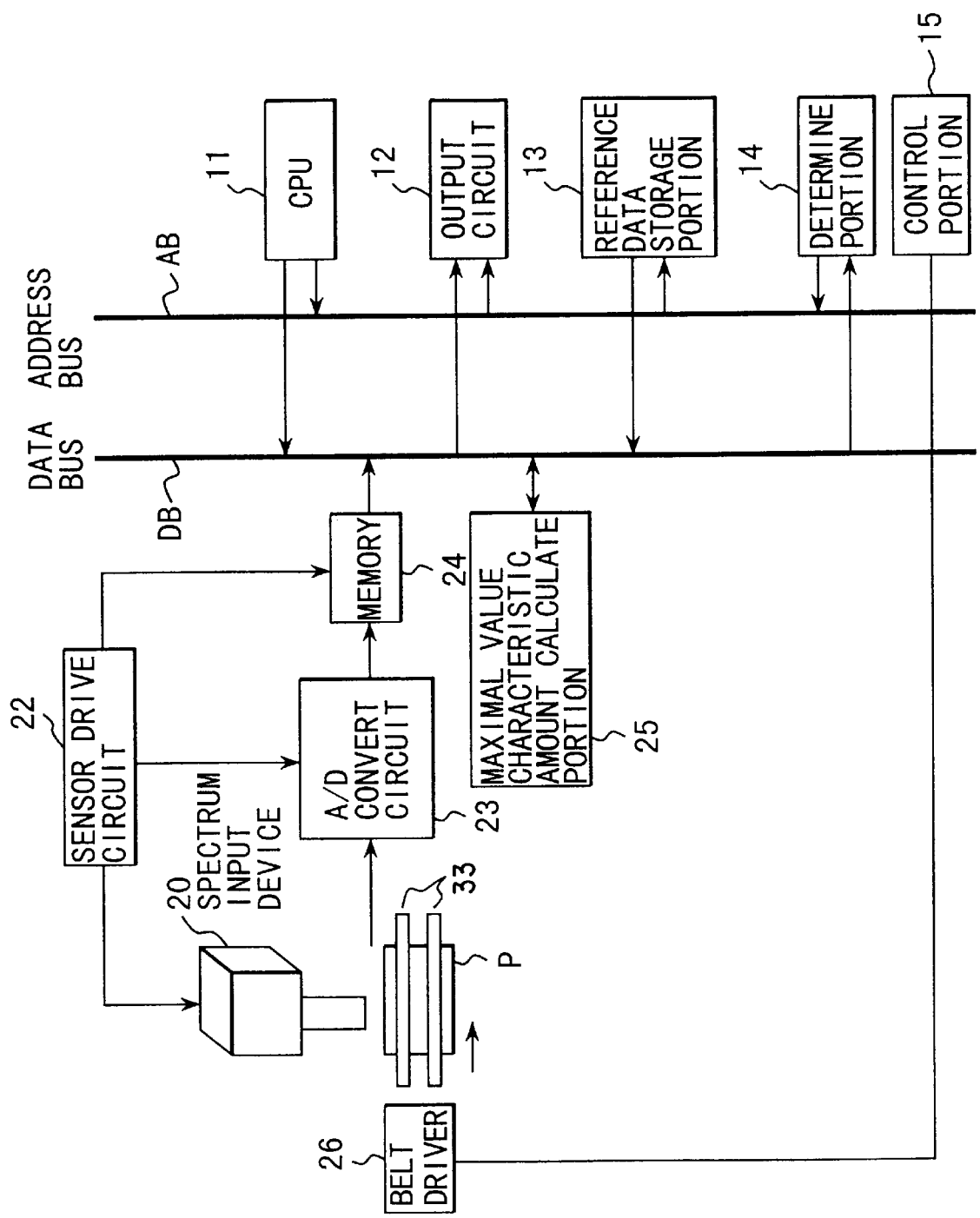
FIG. 33 is a block diagram showing a structure of a color inspection system according to a tenth embodiment of the present invention.
Figure 34:
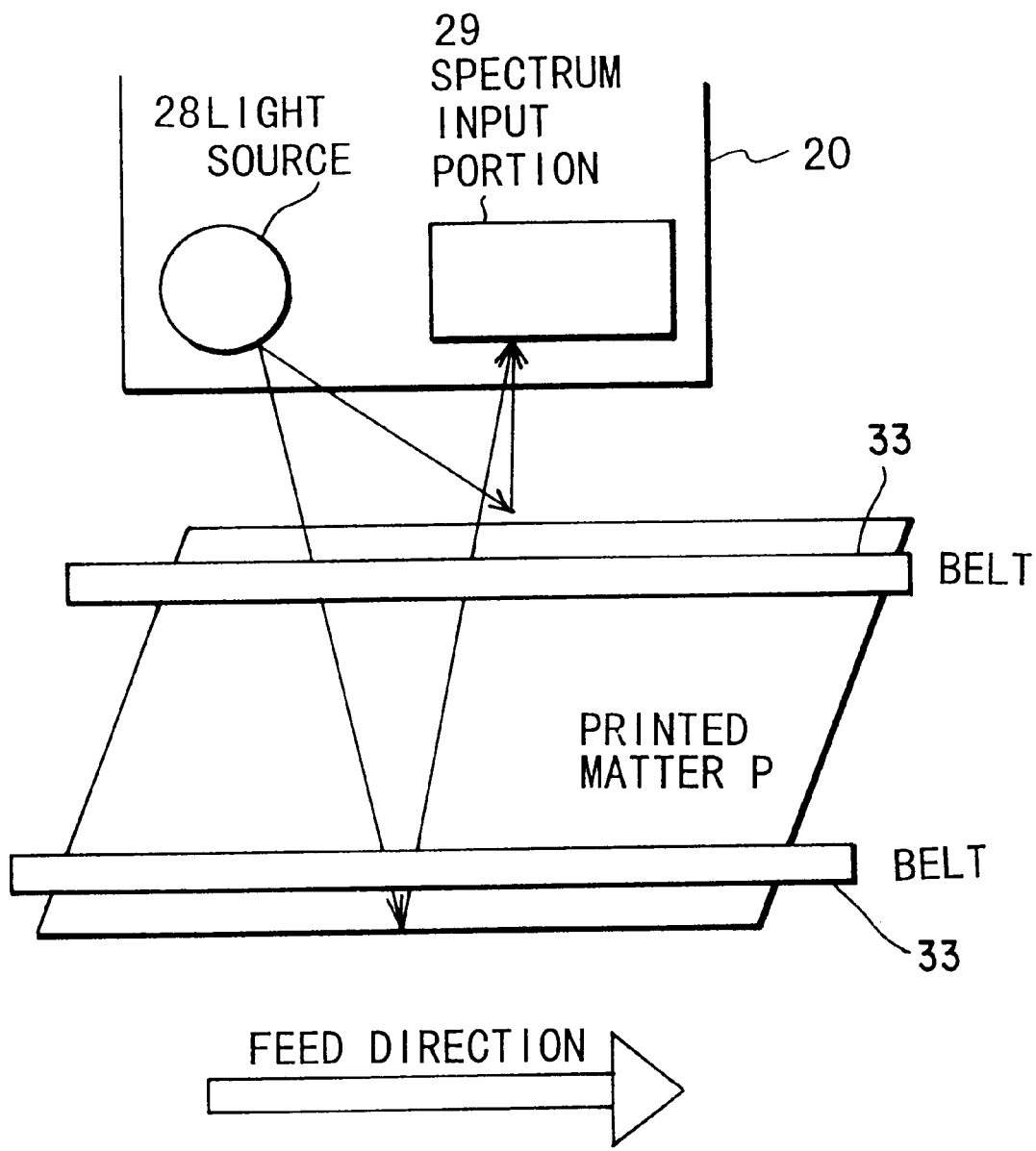
FIG. 34 is a view showing a relationship between a printed matter P and a belt conveyer according to the tenth embodiment of the present invention.
Figure 35:
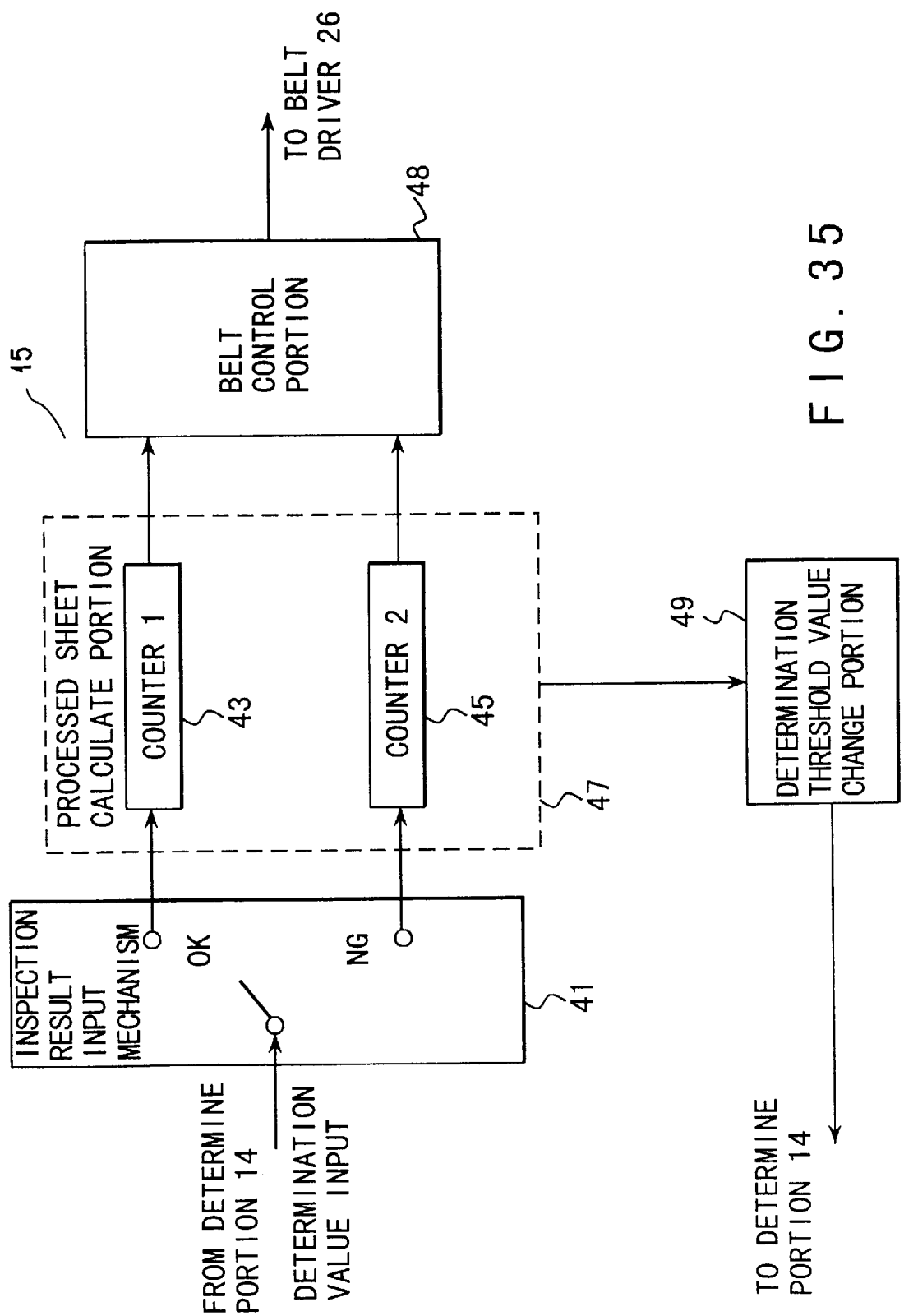
FIG. 35 is a view showing a structure of a control section 15 in a color inspection system according to the tenth embodiment of the present invention.

FIG. 33 is a block diagram showing a structure of a color inspection system according to a tenth embodiment of the present invention. FIG. 34 is a view showing a relationship between a belt conveyer and a printed matter P. FIG. 35 is a view showing a structure of a control portion 15 of the color inspection system.

In FIG. 33, the color inspection system comprises an output circuit 12, a reference data storage portion 13, a determine portion 14, and a control portion 15, each of which is connected to a data bus DA and an address bus AB. This system further comprises a spectrum input device 20 connected to a sensor drive circuit 22, an A/D convert circuit 23, a memory 24, a maximal value characteristic amount calculate portion 25 connected to the data bus DA, a belt driver 26 for driving a belt connected to the control portion 15, and a belt 33 for driving a printed matter P driven by the belt driver 26.

FIG. 34 shows that light emitted from a light source 28 included in the spectrum input device 20 reaches the surface of a printed matter P fed by a belt, and light reflected therefrom is supplied to the spectrum input portion 29 of the spectrum input device 20.

FIG. 35 specifically shows the structure of the control portion 15, and the control portion 15 includes an inspection result input mechanism 41, a processed sheet count portion 47 connected to the portion 41, a belt control portion 48 connected to the count portion 47, and a determine threshold value change portion 49 connected to the processed sheet count portion 47 described above.

In the structure as described above, the present system detects color characteristics of an inspection target object, like in the first embodiment. The present system, however, provides the following operation due to the control portion 15, the belt driver 26 controlled by the control portion 15, and the belt 33 for driving the printed matter P. Specifically, printed matters P are fed, sheet by sheet, below the spectrum input device 20, by the operation of the belt 33 driven by the belt driver 26 driven by the control portion 15. The determine portion 14 finally determines whether or not the printed matters P have a reference color.

Thereafter, a determination value as the determination result is supplied from the determine portion 14 to the inspection result input mechanism 41 of the control portion 15. For example, a counter 1 of the processed sheet count portion 47 counts up one when a printed matter P is determined as OK meaning that the printed matter P includes a reference color. When a printed matter P is determined as NG, another counter 2 of the processed sheet count portion 47 counts up one. This determination result is considered as meaning completion of inspection of a printed matter P, and is supplied to the belt control portion 48.

Thereafter, a drive signal is supplied to the belt driver 26 from the belt control portion 48, in accordance with determination by the belt control portion, so that a next printed matter P is fed below the spectrum input device 20. As a result, the belt is driven again by the belt driver, and a new printed matter P is fed below the spectrum input device 20. Inspection of the target object as has been described above is then repeated.

Further, values counted by the counters 1 and 2 in the processed sheet count portion 47 are supplied to a determination threshold value change portion 49, and the threshold value of the determine portion 14 used for determination is changed in accordance with the counter values thus supplied. Specifically, if OK is issued too frequently, the threshold value is automatically changed so that the rate of OK is adjusted properly.

As has been explained above, in the color inspection system according to the tenth embodiment, a great deal of printed matters are sequentially inspected and driving of the belt is automatically controlled for every time determination is carried out, so that stable automatic operation of inspection processing is realized. Further, the threshold value used for determination is not fixed to an initialized value, but is automatically changed properly in accordance with counter values as accumulation of determination results. Therefore, sequential determination processing is realized with a higher accuracy.

As has been specifically described above, according to the present invention, transmitted light or reflected light from an inspection target object such as a color printed matter or the like is divided into a plurality of kinds of wavelength components with use of a diffraction grating spectrometer or the like. Spectrum signals of the wavelength components are subjected to preprocessing such as correction and difference calculation, if necessary, and localized characteristic amounts are calculated from converted spectrum signals relating to the wavelength components. Further, the characteristic amounts are compared with reference data, to carry out identification or inspection of colors. Therefore, it is possible to provide a color detecting apparatus which securely detects a fine difference in colors caused due to the accuracy of the wavelength directions, in color inspection for an inspection target object, so that color inspection with a high accuracy is achieved.

Additional advantages and modifications will readily occur to those skilled in the art. Therefore, the invention in its broader aspects is not limited to the specific details, and representative, embodiments shown and described herein. Accordingly, various modifications may be made without departing from the spirit or scope of the general inventive concept as defined by the appended claims and their equivalents.

What is claimed is:

1. A color detecting apparatus comprising:
    means for distributing light from a color printed matter having color data into a plurality of components of various wavelengths;
    means for inputting an intensity of the light corresponding to each of the components as spectrum data;
    means for calculating a characteristic amount relating to a maximal value of the spectrum data;
    means for storing a reference characteristic amount of a reference color data;
    means for comparing the characteristic amount calculated by the calculating means with the stored reference characteristic amount so as to output a comparison result; and
    means for determining a color of the color printed matter corresponding to the comparison result, wherein the comparing means further comprises:
        means for comparing a number of, a wavelength of and a size of the maximal values of the spectrum data with a number of, a wavelength of and a size of the maximal values of the reference color data respectively so as to output the comparison result.

2. A color detecting apparatus comprising:

means for distributing light from a color printed matter having color data into a plurality of wavelength components;

means for inputting an intensity of the light corresponding to each of the plurality of the wavelength components as spectrum data;

means for calculating a characteristic amount relating to a peak value of the spectrum data inputted by the inputting means;

means for storing a reference characteristic amount of a reference color data;

means for storing a reference characteristic amount calculated by the calculating means with the stored reference characteristic amount so as to output a comparison result; and means for determining a color on the color printed matter corresponding to the comparison result, wherein the comparing means comprises:

means for comparing a half band width of the peak value of the spectrum data with a half band width of a peak value of the stored reference color data, respectively so as to output the comparison result, said half bandwidth being a distance to a most distant one of inflection points which contains wavelengths with respect to peaks of the spectrum data and reference data respectively.

3. A color detecting apparatus comprising:

means for distributing light from a color printed matter having color data into a plurality of wavelength components;

means for inputting an intensity of the light corresponding to each of the plurality of the wavelength components as spectrum data;

means for calculating a characteristic amount relating to a peak value of the spectrum data inputted by the inputting means;

means for storing a reference characteristic amount of a reference color data;

means for comparing the characteristic amount calculated by the calculating means with the stored reference characteristic amount so as to output a comparison result; and means for determining a color on the color printed matter corresponding to the comparison result, wherein the comparing means further comprises:

means for comparing a number of, a wavelength of, a half band width of and a size of the peak values of the spectrum data with a number of, a wavelength of, a half band width of and a size of the peak values of the reference color data respectively so as to output the comparison result.

* * * * *